(12) United States Patent
Hampson et al.

(10) Patent No.: US 12,325,790 B2
(45) Date of Patent: *Jun. 10, 2025

(54) BINDER COMPOSITIONS AND USES THEREOF

(71) Applicants: KNAUF INSULATION SPRL, Vise (BE); MCTRON TECHNOLOGIES, INC., Greenville, SC (US)

(72) Inventors: Carl Hampson, Liverpool (GB); Oliver Callaghan, Manchester (GB); Kenneth Snyder, Mauldin, SC (US)

(73) Assignees: Knauf Insulation, Inc., Shelbyville, IN (US); Knauf Insulation SPRL, Vise (BE); McTron Technologies, Inc., Greenville, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/412,735

(22) Filed: Jan. 15, 2024

(65) Prior Publication Data

US 2024/0150558 A1     May 9, 2024

Related U.S. Application Data

(63) Continuation of application No. 17/041,892, filed as application No. PCT/EP2019/057803 on Mar. 27, 2019, now Pat. No. 11,939,460.

(60) Provisional application No. 62/662,494, filed on Apr. 25, 2018.

(30) Foreign Application Priority Data

Mar. 27, 2018 (GB) .................. 1804908

(51) Int. Cl.
| | | |
|---|---|---|
| C08J 5/24 | (2006.01) | |
| C08G 12/06 | (2006.01) | |
| C08L 3/02 | (2006.01) | |
| C08L 21/02 | (2006.01) | |
| C08L 61/22 | (2006.01) | |
| C08L 3/00 | (2006.01) | |
| C08L 79/00 | (2006.01) | |

(52) U.S. Cl.
CPC ............ *C08L 3/02* (2013.01); *C08G 12/06* (2013.01); *C08J 5/246* (2021.05); *C08L 21/02* (2013.01); *C08L 61/22* (2013.01)

(58) Field of Classification Search
None
See application file for complete search history.

(56) References Cited

U.S. PATENT DOCUMENTS

| | | |
|---|---|---|
| 1,801,052 A | 4/1931 | Meigs |
| 1,801,053 A | 4/1931 | Meigs |
| 1,886,353 A | 11/1932 | Novotny et al. |
| 1,902,948 A | 3/1933 | Castle |
| 1,964,263 A | 6/1934 | Krenke |
| 2,198,874 A | 4/1940 | Leighton |
| 2,215,825 A | 9/1940 | Wallace et al. |
| 2,261,295 A | 11/1941 | Schlack |
| 2,362,086 A | 11/1944 | Eastes et al. |
| 2,371,990 A | 3/1945 | Hanford |
| 2,392,105 A | 1/1946 | Sussman |
| 2,442,989 A | 6/1948 | Sussman |
| 2,500,665 A | 3/1950 | Courtright |
| 2,518,956 A | 8/1950 | Sussman |
| 2,875,073 A | 2/1959 | Gogek |
| 2,894,920 A | 7/1959 | Ramos |
| 2,965,504 A | 12/1960 | Gogek |
| 3,038,462 A | 6/1962 | Bohdan |
| 3,138,473 A | 6/1964 | Floyd et al. |
| 3,222,243 A | 12/1965 | Gaston et al. |
| 3,231,349 A | 1/1966 | Stalego |
| 3,232,821 A | 2/1966 | Banks et al. |
| 3,297,419 A | 1/1967 | Eyre, Jr. |
| 3,513,001 A | 5/1970 | Woodhead et al. |
| 3,551,365 A | 12/1970 | Matalon |
| 3,784,408 A | 1/1974 | Jaffe et al. |
| 3,791,807 A | 2/1974 | Etzel et al. |
| 3,802,897 A | 4/1974 | Bovier et al. |
| 3,809,664 A | 5/1974 | Burr et al. |
| 3,826,767 A | 7/1974 | Hoover et al. |
| 3,856,606 A | 12/1974 | Fan et al. |
| 3,867,119 A | 2/1975 | Takeo et al. |
| 3,907,724 A | 9/1975 | Higginbottom |
| 3,911,048 A | 10/1975 | Vargiu et al. |
| 3,919,134 A | 11/1975 | Higginbottom |

(Continued)

FOREIGN PATENT DOCUMENTS

| | | |
|---|---|---|
| AU | 8538765 | 8/1985 |
| AU | 9640921 | 7/1997 |

(Continued)

OTHER PUBLICATIONS

International Search Report and Written Opinion for PCT/EP2019/057803 (11 pages)—completed Jun. 19, 2019.
Office action for co-pending U.S. Appl. No. 17/041,892 (17 pages)—Jun. 22, 2023.
International Search Report and Written Opinion for PCT/US2008/059730, completed Sep. 22, 2008.
International Search Report and Written Opinion for PCT/US2008/069046, completed Sep. 25, 2008.
International Search Report and Written Opinion for PCT/EP2011/059317, completed Jul. 15, 2011.
International Search Report for PCT/EP2008/060185, completed Oct. 23, 2008.
International Search Report for PCT/EP2011/057363, completed Sep. 5, 2011.

(Continued)

*Primary Examiner* — Michael J Feely
(74) *Attorney, Agent, or Firm* — Barnes & Thornburg LLP

(57) ABSTRACT

A binder used for manufacturing a composite product is prepared by combining i) Maillard reactants selected from: reducing sugar reactant(s) and nitrogen-containing reactant(s); curable reaction product(s) of reducing sugar reactant(s) and nitrogen-containing reactant(s); and combinations thereof; and ii) a resin; reactants of a resin; and combinations thereof.

12 Claims, 2 Drawing Sheets

(56) References Cited

U.S. PATENT DOCUMENTS

| | | |
|---|---|---|
| 3,922,466 A | 11/1975 | Bell et al. |
| 3,955,031 A | 5/1976 | Jones et al. |
| 3,956,204 A | 5/1976 | Higginbottom |
| 3,961,081 A | 6/1976 | Mckenzie |
| 3,971,807 A | 7/1976 | Brack |
| 4,014,726 A | 3/1977 | Fargo |
| 4,028,290 A | 6/1977 | Reid |
| 4,048,127 A | 9/1977 | Gibbons et al. |
| 4,054,713 A | 10/1977 | Sakaguchi et al. |
| 4,085,076 A | 4/1978 | Gibbons et al. |
| 4,097,427 A | 6/1978 | Aitken et al. |
| 4,107,379 A | 8/1978 | Stofko |
| 4,109,057 A | 8/1978 | Nakamura et al. |
| 4,144,027 A | 3/1979 | Habib |
| 4,148,765 A | 4/1979 | Nelson |
| 4,183,997 A | 1/1980 | Stofko |
| 4,184,986 A | 1/1980 | Krasnobajew et al. |
| 4,186,053 A | 1/1980 | Krasnobajew et al. |
| 4,201,247 A | 5/1980 | Shannon |
| 4,201,857 A | 5/1980 | Krasnobajew et al. |
| 4,217,414 A | 8/1980 | Walon |
| 4,233,432 A | 11/1980 | Curtis, Jr. |
| 4,246,367 A | 1/1981 | Curtis, Jr. |
| 4,259,190 A | 3/1981 | Fahey |
| 4,265,963 A | 5/1981 | Matalon |
| 4,278,573 A | 7/1981 | Tessler |
| 4,296,173 A | 10/1981 | Fahey |
| 4,301,310 A | 11/1981 | Wagner |
| 4,310,585 A | 1/1982 | Shannon |
| 4,322,523 A | 3/1982 | Wagner |
| 4,330,443 A | 5/1982 | Rankin |
| 4,333,484 A | 6/1982 | Keritsis |
| 4,357,194 A | 11/1982 | Stofko |
| 4,361,588 A | 11/1982 | Herz |
| 4,379,101 A | 4/1983 | Smith |
| 4,393,019 A | 7/1983 | Geimer |
| 4,396,430 A | 8/1983 | Matalon |
| 4,400,496 A | 8/1983 | Butler et al. |
| 4,464,523 A | 8/1984 | Neigel et al. |
| 4,506,684 A | 3/1985 | Keritsis |
| 4,520,143 A | 5/1985 | Jellinek |
| 4,524,164 A | 6/1985 | Viswanathan et al. |
| 4,631,226 A | 12/1986 | Jellinek |
| 4,654,259 A | 3/1987 | Stofko |
| 4,668,716 A | 5/1987 | Pepe et al. |
| 4,692,478 A | 9/1987 | Viswanathan et al. |
| 4,714,727 A | 12/1987 | Hume, III |
| 4,720,295 A | 1/1988 | Bronshtein |
| 4,734,996 A | 4/1988 | Kim et al. |
| 4,754,056 A | 6/1988 | Ansel et al. |
| 4,761,184 A | 8/1988 | Markessini |
| 4,780,339 A | 10/1988 | Lacourse et al. |
| 4,828,643 A | 5/1989 | Newman et al. |
| 4,845,162 A | 7/1989 | Schmitt et al. |
| 4,906,237 A | 3/1990 | Johansson et al. |
| 4,912,147 A | 3/1990 | Pfoehler et al. |
| 4,918,861 A | 4/1990 | Carpenter et al. |
| 4,923,980 A | 5/1990 | Blomberg |
| 4,950,444 A | 8/1990 | Deboufie et al. |
| 4,988,780 A | 1/1991 | Das et al. |
| 4,992,519 A | 2/1991 | Mukherjee |
| 5,001,202 A | 3/1991 | Denis et al. |
| 5,013,405 A | 5/1991 | Izard |
| 5,032,431 A | 7/1991 | Conner et al. |
| 5,037,930 A | 8/1991 | Shih |
| 5,041,595 A | 8/1991 | Yang et al. |
| 5,089,342 A | 2/1992 | Dhein et al. |
| 5,095,054 A | 3/1992 | Lay et al. |
| 5,106,615 A | 4/1992 | Dikstein |
| 5,114,004 A | 5/1992 | Isono et al. |
| 5,123,949 A | 6/1992 | Thiessen |
| 5,124,369 A | 6/1992 | Vandichel et al. |
| 5,128,407 A | 7/1992 | Layton et al. |
| 5,143,582 A | 9/1992 | Arkens et al. |
| 5,151,465 A | 9/1992 | Le-Khac |
| 5,167,738 A | 12/1992 | Bichot et al. |
| 5,198,492 A | 3/1993 | Stack |
| 5,217,741 A | 6/1993 | Kawachi et al. |
| 5,218,048 A | 6/1993 | Abe et al. |
| 5,240,498 A | 8/1993 | Matalon et al. |
| 5,244,474 A | 9/1993 | Lorcks et al. |
| 5,278,222 A | 1/1994 | Stack |
| 5,300,144 A | 4/1994 | Adams |
| 5,300,192 A | 4/1994 | Hansen et al. |
| 5,308,896 A | 5/1994 | Hansen et al. |
| 5,318,990 A | 6/1994 | Strauss |
| 5,336,753 A | 8/1994 | Jung et al. |
| 5,336,755 A | 8/1994 | Pape |
| 5,336,766 A | 8/1994 | Koga et al. |
| 5,340,868 A | 8/1994 | Strauss et al. |
| 5,352,480 A | 10/1994 | Hansen et al. |
| 5,367,849 A | 11/1994 | Bullock |
| 5,371,194 A | 12/1994 | Ferretti |
| 5,387,665 A | 2/1995 | Misawa et al. |
| 5,389,716 A | 2/1995 | Graves |
| 5,393,849 A | 2/1995 | Srinivasan et al. |
| 5,416,139 A | 5/1995 | Zeiszler |
| 5,421,838 A | 6/1995 | Gosset et al. |
| 5,424,418 A | 6/1995 | Duflot |
| 5,434,233 A | 7/1995 | Kiely et al. |
| 5,447,977 A | 9/1995 | Hansen et al. |
| 5,470,843 A | 11/1995 | Stahl et al. |
| 5,480,973 A | 1/1996 | Goodlad et al. |
| 5,492,756 A | 2/1996 | Seale et al. |
| 5,498,662 A | 3/1996 | Tanaka et al. |
| 5,503,920 A | 4/1996 | Alkire et al. |
| 5,534,612 A | 7/1996 | Taylor et al. |
| 5,536,766 A | 7/1996 | Seyffer et al. |
| 5,538,783 A | 7/1996 | Hansen et al. |
| 5,543,215 A | 8/1996 | Hansen et al. |
| 5,545,279 A | 8/1996 | Hall et al. |
| 5,547,541 A | 8/1996 | Hansen et al. |
| 5,547,745 A | 8/1996 | Hansen et al. |
| 5,550,189 A | 8/1996 | Qin et al. |
| 5,554,730 A | 9/1996 | Woiszwillo et al. |
| 5,562,740 A | 10/1996 | Cook et al. |
| 5,571,618 A | 11/1996 | Hansen et al. |
| 5,578,678 A | 11/1996 | Hartmann et al. |
| 5,580,856 A | 12/1996 | Prestrelski et al. |
| 5,582,682 A | 12/1996 | Ferretti |
| 5,583,193 A | 12/1996 | Aravindakshan et al. |
| 5,589,256 A | 12/1996 | Hansen et al. |
| 5,589,536 A | 12/1996 | Golino et al. |
| 5,607,759 A | 3/1997 | Hansen et al. |
| 5,608,011 A | 3/1997 | Eck et al. |
| 5,609,727 A | 3/1997 | Hansen et al. |
| 5,614,570 A | 3/1997 | Hansen et al. |
| 5,620,940 A | 4/1997 | Birbara et al. |
| 5,621,026 A | 4/1997 | Tanaka et al. |
| 5,633,298 A | 5/1997 | Arfaei et al. |
| 5,641,561 A | 6/1997 | Hansen et al. |
| 5,643,978 A | 7/1997 | Darwin et al. |
| 5,645,756 A | 7/1997 | Dubin et al. |
| 5,660,904 A | 8/1997 | Andersen et al. |
| 5,661,213 A | 8/1997 | Arkens et al. |
| 5,670,585 A | 9/1997 | Taylor et al. |
| 5,672,418 A | 9/1997 | Hansen et al. |
| 5,672,659 A | 9/1997 | Shalaby et al. |
| 5,690,715 A | 11/1997 | Schiwek |
| 5,691,060 A | 11/1997 | Levy |
| 5,693,411 A | 12/1997 | Hansen et al. |
| 5,719,092 A | 2/1998 | Arrington |
| 5,719,228 A | 2/1998 | Taylor et al. |
| 5,733,624 A | 3/1998 | Syme et al. |
| 5,756,580 A | 5/1998 | Natori et al. |
| 5,763,524 A | 6/1998 | Arkens et al. |
| 5,788,243 A | 8/1998 | Harshaw et al. |
| 5,788,423 A | 8/1998 | Perkins |
| 5,807,364 A | 9/1998 | Hansen |
| 5,855,987 A | 1/1999 | Margel et al. |
| 5,863,985 A | 1/1999 | Shalaby et al. |
| 5,885,337 A | 3/1999 | Nohr et al. |
| 5,895,804 A | 4/1999 | Lee et al. |
| 5,905,115 A | 5/1999 | Luitjes et al. |

(56) References Cited

U.S. PATENT DOCUMENTS

| | | |
|---|---|---|
| 5,916,503 A | 6/1999 | Rettenbacher |
| 5,919,528 A | 7/1999 | Huijs et al. |
| 5,919,831 A | 7/1999 | Philipp |
| 5,922,403 A | 7/1999 | Tecle |
| 5,925,722 A | 7/1999 | Exner et al. |
| 5,929,184 A | 7/1999 | Holmes-Farley et al. |
| 5,929,196 A | 7/1999 | Kissel et al. |
| 5,932,344 A | 8/1999 | Ikemoto et al. |
| 5,932,665 A | 8/1999 | DePorter et al. |
| 5,932,689 A | 8/1999 | Arkens et al. |
| 5,942,123 A | 8/1999 | Mcardle |
| 5,954,869 A | 9/1999 | Elfersy et al. |
| 5,977,224 A | 11/1999 | Cheung et al. |
| 5,977,232 A | 11/1999 | Arkens et al. |
| 5,981,719 A | 11/1999 | Woiszwillo et al. |
| 5,983,586 A | 11/1999 | Berdan, II et al. |
| 5,990,216 A | 11/1999 | Cai et al. |
| 5,993,709 A | 11/1999 | Bonomo et al. |
| 6,022,615 A | 2/2000 | Rettenbacher |
| 6,067,821 A | 5/2000 | Jackson et al. |
| 6,071,549 A | 6/2000 | Hansen |
| 6,071,994 A | 6/2000 | Hummerich et al. |
| 6,072,086 A | 6/2000 | James et al. |
| 6,077,883 A | 6/2000 | Taylor et al. |
| 6,090,925 A | 7/2000 | Woiszwillo et al. |
| 6,114,033 A | 9/2000 | Ikemoto et al. |
| 6,114,464 A | 9/2000 | Reck et al. |
| 6,133,347 A | 10/2000 | Vickers, Jr. et al. |
| 6,136,916 A | 10/2000 | Arkens et al. |
| 6,139,619 A | 10/2000 | Zaretskiy et al. |
| 6,143,243 A | 11/2000 | Gershun et al. |
| 6,171,444 B1 | 1/2001 | Nigam |
| 6,171,654 B1 | 1/2001 | Salsman et al. |
| 6,180,037 B1 | 1/2001 | Anderson et al. |
| 6,194,512 B1 | 2/2001 | Chen et al. |
| 6,210,472 B1 | 4/2001 | Kwan et al. |
| 6,221,958 B1 | 4/2001 | Shalaby et al. |
| 6,221,973 B1 | 4/2001 | Arkens et al. |
| 6,231,721 B1 | 5/2001 | Quick et al. |
| 6,274,661 B1 | 8/2001 | Chen et al. |
| 6,281,298 B1 | 8/2001 | Papsin, Jr. |
| 6,299,677 B1 | 10/2001 | Johnson et al. |
| 6,299,936 B1 | 10/2001 | Reck et al. |
| 6,307,732 B1 | 10/2001 | Tsubaki et al. |
| 6,310,227 B1 | 10/2001 | Sarama et al. |
| 6,313,102 B1 | 11/2001 | Colaco et al. |
| 6,319,683 B1 | 11/2001 | James et al. |
| 6,331,350 B1 | 12/2001 | Taylor et al. |
| 6,331,513 B1 | 12/2001 | Zaid et al. |
| 6,340,411 B1 | 1/2002 | Hansen et al. |
| 6,348,530 B1 | 2/2002 | Reck et al. |
| 6,365,079 B1 | 4/2002 | Winkler et al. |
| 6,372,077 B1 | 4/2002 | Tecle |
| 6,379,739 B1 | 4/2002 | Formanek et al. |
| 6,379,814 B1 | 4/2002 | Dupre et al. |
| 6,395,856 B1 | 5/2002 | Petty et al. |
| 6,403,665 B1 | 6/2002 | Sieker et al. |
| 6,407,225 B1 | 6/2002 | Mang et al. |
| 6,410,036 B1 | 6/2002 | De Rosa et al. |
| 6,440,204 B1 | 8/2002 | Rogols et al. |
| 6,441,122 B1 | 8/2002 | DeMott et al. |
| 6,461,553 B1 | 10/2002 | Hansen et al. |
| 6,468,442 B2 | 10/2002 | Bytnar |
| 6,468,730 B2 | 10/2002 | Fujiwara et al. |
| 6,469,120 B1 | 10/2002 | Elfersy et al. |
| 6,475,552 B1 | 11/2002 | Shah et al. |
| 6,482,875 B2 | 11/2002 | Lorenz et al. |
| 6,495,656 B1 | 12/2002 | Haile et al. |
| 6,521,339 B1 | 2/2003 | Hansen et al. |
| 6,525,009 B2 | 2/2003 | Sachdev et al. |
| 6,538,057 B1 | 3/2003 | Wildburg et al. |
| 6,547,867 B2 | 4/2003 | Rogols et al. |
| 6,555,616 B1 | 4/2003 | Helbing et al. |
| 6,559,302 B1 | 5/2003 | Shah et al. |
| 6,562,267 B1 | 5/2003 | Hansen et al. |
| 6,596,103 B1 | 7/2003 | Hansen et al. |
| 6,613,378 B1 | 9/2003 | Erhan et al. |
| 6,638,882 B1 | 10/2003 | Helbing et al. |
| 6,638,884 B2 | 10/2003 | Quick et al. |
| 6,699,945 B1 | 3/2004 | Chen et al. |
| 6,706,853 B1 | 3/2004 | Stanssens et al. |
| 6,719,862 B1 | 4/2004 | Quick et al. |
| 6,730,730 B1 | 5/2004 | Hansen et al. |
| 6,753,361 B2 | 6/2004 | Kroner et al. |
| 6,818,694 B2 | 11/2004 | Hindi et al. |
| 6,821,547 B2 | 11/2004 | Shah et al. |
| 6,852,247 B2 | 2/2005 | Bytnar |
| 6,858,074 B2 | 2/2005 | Anderson et al. |
| 6,861,495 B2 | 3/2005 | Barsotti et al. |
| 6,864,044 B2 | 3/2005 | Ishikawa et al. |
| 6,878,800 B2 | 4/2005 | Husemoen et al. |
| 6,884,849 B2 | 4/2005 | Chen et al. |
| 6,955,844 B2 | 10/2005 | Tagge et al. |
| 6,962,714 B2 | 11/2005 | Hei et al. |
| 6,989,171 B2 | 1/2006 | Portman |
| 6,992,203 B2 | 1/2006 | Trusovs |
| 7,018,490 B2 | 3/2006 | Hansen et al. |
| 7,029,717 B1 | 4/2006 | Ojima et al. |
| 7,067,579 B2 | 6/2006 | Taylor et al. |
| 7,083,831 B1 | 8/2006 | Koch et al. |
| 7,090,745 B2 | 8/2006 | Beckman et al. |
| 7,141,626 B2 | 11/2006 | Rodrigues et al. |
| 7,144,474 B1 | 12/2006 | Hansen et al. |
| 7,195,792 B2 | 3/2007 | Boston et al. |
| 7,201,778 B2 | 4/2007 | Smith et al. |
| 7,201,825 B2 | 4/2007 | Dezutter et al. |
| 7,202,326 B2 | 4/2007 | Kuroda et al. |
| 7,241,487 B2 | 7/2007 | Taylor et al. |
| 7,458,235 B2 | 12/2008 | Beaufils et al. |
| 7,514,027 B2 | 4/2009 | Horres et al. |
| 7,655,711 B2 | 2/2010 | Swift et al. |
| 7,772,347 B2 | 8/2010 | Swift et al. |
| 7,795,354 B2 | 9/2010 | Srinivasan et al. |
| 7,803,879 B2 | 9/2010 | Srinivasan et al. |
| 7,807,771 B2 | 10/2010 | Swift et al. |
| 7,842,382 B2 | 11/2010 | Helbing |
| 7,854,980 B2 | 12/2010 | Jackson et al. |
| 7,883,693 B2 | 2/2011 | Sehl et al. |
| 7,888,445 B2 | 2/2011 | Swift et al. |
| 7,947,765 B2 | 5/2011 | Swift et al. |
| 8,114,210 B2 | 2/2012 | Hampson et al. |
| 8,182,648 B2 | 5/2012 | Swift et al. |
| 8,211,923 B2 | 7/2012 | Wagner et al. |
| 8,372,900 B2 | 2/2013 | Shooshtari et al. |
| 8,377,564 B2 | 2/2013 | Shooshtari et al. |
| 8,501,838 B2 | 8/2013 | Jackson et al. |
| 8,552,140 B2 | 10/2013 | Swift |
| 8,680,224 B2 | 3/2014 | Zhang et al. |
| 8,691,934 B2 | 4/2014 | Helbing et al. |
| 8,900,495 B2 | 12/2014 | Pacorel et al. |
| 9,492,943 B2 | 11/2016 | Hand |
| 10,508,172 B2 | 12/2019 | Pacorel |
| 11,939,460 B2 * | 3/2024 | Hampson ............... C08L 21/02 |
| 2001/0017427 A1 | 8/2001 | Rosthauser et al. |
| 2001/0046824 A1 | 11/2001 | Nigam |
| 2002/0000100 A1 | 1/2002 | Burg et al. |
| 2002/0025435 A1 | 2/2002 | Hansen et al. |
| 2002/0026025 A1 | 2/2002 | Kuo et al. |
| 2002/0028857 A1 | 3/2002 | Holy |
| 2002/0032253 A1 | 3/2002 | Lorenz et al. |
| 2002/0042473 A1 | 4/2002 | Trollsas et al. |
| 2002/0091185 A1 | 7/2002 | Taylor et al. |
| 2002/0096278 A1 | 7/2002 | Foster et al. |
| 2002/0123598 A1 | 9/2002 | Sieker et al. |
| 2002/0130439 A1 | 9/2002 | Kroner et al. |
| 2002/0161108 A1 | 10/2002 | Schultz et al. |
| 2002/0197352 A1 | 12/2002 | Portman |
| 2003/0005857 A1 | 1/2003 | Minami et al. |
| 2003/0040239 A1 | 2/2003 | Toas et al. |
| 2003/0044513 A1 | 3/2003 | Shah et al. |
| 2003/0066523 A1 | 4/2003 | Lewis et al. |
| 2003/0071879 A1 | 4/2003 | Swenson |
| 2003/0116294 A1 | 6/2003 | Kehrer et al. |
| 2003/0134945 A1 | 7/2003 | Capps |

(56) References Cited

U.S. PATENT DOCUMENTS

| | | |
|---|---|---|
| 2003/0148084 A1 | 8/2003 | Trocino |
| 2003/0153690 A1 | 8/2003 | Husemoen et al. |
| 2003/0185991 A1 | 10/2003 | Wigger et al. |
| 2003/0203117 A1 | 10/2003 | Bartkowiak et al. |
| 2004/0002567 A1 | 1/2004 | Chen et al. |
| 2004/0019168 A1 | 1/2004 | Soerens et al. |
| 2004/0024170 A1 | 2/2004 | Husemoen et al. |
| 2004/0033269 A1 | 2/2004 | Hei et al. |
| 2004/0033747 A1 | 2/2004 | Miller et al. |
| 2004/0034154 A1 | 2/2004 | Tutin et al. |
| 2004/0038017 A1 | 2/2004 | Tutin et al. |
| 2004/0048531 A1 | 3/2004 | Belmares et al. |
| 2004/0077055 A1 | 4/2004 | Fosdick et al. |
| 2004/0079499 A1 | 4/2004 | Dezutter et al. |
| 2004/0087024 A1 | 5/2004 | Bellocq et al. |
| 2004/0087719 A1 | 5/2004 | Rautschek et al. |
| 2004/0122166 A1 | 6/2004 | O'Brien-Bernini et al. |
| 2004/0131874 A1 | 7/2004 | Tutin et al. |
| 2004/0144706 A1 | 7/2004 | Beaufils et al. |
| 2004/0152824 A1 | 8/2004 | Dobrowolski |
| 2004/0161993 A1 | 8/2004 | Tripp et al. |
| 2004/0209851 A1 | 10/2004 | Nelson et al. |
| 2004/0213930 A1 | 10/2004 | Halabisky |
| 2004/0220368 A1 | 11/2004 | Li et al. |
| 2004/0249066 A1 | 12/2004 | Heinzman et al. |
| 2004/0254285 A1 | 12/2004 | Rodrigues et al. |
| 2004/0260082 A1 | 12/2004 | Van Der Wilden et al. |
| 2005/0001198 A1 | 1/2005 | Bytnar |
| 2005/0017394 A1 | 1/2005 | Hochsmann et al. |
| 2005/0027283 A1 | 2/2005 | Richard et al. |
| 2005/0033037 A1 | 2/2005 | Trusovs |
| 2005/0048212 A1 | 3/2005 | Clamen et al. |
| 2005/0059770 A1 | 3/2005 | Srinivasan et al. |
| 2005/0171085 A1 | 8/2005 | Pinto et al. |
| 2005/0196421 A1 | 9/2005 | Hunter et al. |
| 2005/0202224 A1 | 9/2005 | Helbing |
| 2005/0208852 A1 | 9/2005 | Weber |
| 2005/0215153 A1 | 9/2005 | Cossement et al. |
| 2005/0245669 A1 | 11/2005 | Clungeon et al. |
| 2005/0275133 A1 | 12/2005 | Cabell et al. |
| 2005/0288479 A1 | 12/2005 | Kuroda et al. |
| 2006/0005580 A1 | 1/2006 | Espiard et al. |
| 2006/0009569 A1 | 1/2006 | Charbonneau et al. |
| 2006/0044302 A1 | 3/2006 | Chen |
| 2006/0099870 A1 | 5/2006 | Garcia et al. |
| 2006/0111480 A1 | 5/2006 | Hansen et al. |
| 2006/0124538 A1 | 6/2006 | Morcrette et al. |
| 2006/0135433 A1 | 6/2006 | Murray et al. |
| 2006/0141177 A1 | 6/2006 | Ligtenberg et al. |
| 2006/0179892 A1 | 8/2006 | Horres et al. |
| 2006/0188465 A1 | 8/2006 | Perrier et al. |
| 2006/0198954 A1 | 9/2006 | Frechem et al. |
| 2006/0231487 A1 | 10/2006 | Bartley et al. |
| 2006/0252855 A1 | 11/2006 | Pisanova et al. |
| 2006/0281622 A1 | 12/2006 | Maricourt et al. |
| 2007/0006390 A1 | 1/2007 | Clamen et al. |
| 2007/0009582 A1 | 1/2007 | Madsen et al. |
| 2007/0027281 A1 | 2/2007 | Michl et al. |
| 2007/0039520 A1 | 2/2007 | Crews et al. |
| 2007/0082983 A1 | 4/2007 | Crews et al. |
| 2007/0123679 A1 | 5/2007 | Swift et al. |
| 2007/0123680 A1 | 5/2007 | Swift et al. |
| 2007/0129522 A1 | 6/2007 | Burckhardt et al. |
| 2007/0142596 A1 | 6/2007 | Swift et al. |
| 2007/0158022 A1 | 7/2007 | Heep et al. |
| 2007/0184740 A1 | 8/2007 | Keller et al. |
| 2007/0191574 A1 | 8/2007 | Miller et al. |
| 2007/0270070 A1 | 11/2007 | Othman |
| 2007/0287018 A1 | 12/2007 | Tutin et al. |
| 2007/0292618 A1 | 12/2007 | Srinivasan et al. |
| 2007/0292619 A1 | 12/2007 | Srinivasan et al. |
| 2007/0298274 A1 | 12/2007 | Eriksson et al. |
| 2008/0009209 A1 | 1/2008 | Clamen et al. |
| 2008/0009616 A1 | 1/2008 | Frank et al. |
| 2008/0051539 A1 | 2/2008 | Kelly |
| 2008/0060551 A1 | 3/2008 | Crews et al. |
| 2008/0081138 A1 | 4/2008 | Moore et al. |
| 2008/0108741 A1 | 5/2008 | Van Herwijnen et al. |
| 2008/0160260 A1 | 7/2008 | Wada et al. |
| 2008/0160302 A1 | 7/2008 | Asrar et al. |
| 2008/0194738 A1 | 8/2008 | Crews et al. |
| 2009/0169867 A1 | 7/2009 | Kelly |
| 2009/0170978 A1 | 7/2009 | Kelly |
| 2009/0227732 A1 | 9/2009 | Glockner et al. |
| 2009/0301972 A1 | 12/2009 | Hines et al. |
| 2009/0304919 A1 | 12/2009 | Wagner et al. |
| 2009/0306255 A1 | 12/2009 | Patel et al. |
| 2009/0324915 A1 | 12/2009 | Swift et al. |
| 2010/0029160 A1 | 2/2010 | Srinivasan et al. |
| 2010/0058661 A1 | 3/2010 | Jackson et al. |
| 2010/0080976 A1 | 4/2010 | Jackson et al. |
| 2010/0084598 A1 | 4/2010 | Jackson et al. |
| 2010/0086726 A1 | 4/2010 | Jackson et al. |
| 2010/0087571 A1 | 4/2010 | Jackson et al. |
| 2010/0098947 A1 | 4/2010 | Inoue et al. |
| 2010/0117023 A1 | 5/2010 | Dopico et al. |
| 2010/0129640 A1 | 5/2010 | Kelly |
| 2010/0130649 A1 | 5/2010 | Swift et al. |
| 2010/0175826 A1 | 7/2010 | Huenig et al. |
| 2010/0210595 A1 | 8/2010 | Wagner et al. |
| 2010/0222459 A1 | 9/2010 | Kelly et al. |
| 2010/0222463 A1 | 9/2010 | Brady et al. |
| 2010/0222566 A1 | 9/2010 | Fosdick et al. |
| 2010/0282996 A1 | 11/2010 | Jaffrennou et al. |
| 2010/0301256 A1 | 12/2010 | Hampson et al. |
| 2010/0320113 A1 | 12/2010 | Swift |
| 2011/0021672 A1 | 1/2011 | Crews et al. |
| 2011/0039111 A1 | 2/2011 | Shooshtari |
| 2011/0040010 A1 | 2/2011 | Shooshtari |
| 2011/0042303 A1 | 2/2011 | Shooshtari et al. |
| 2011/0045966 A1 | 2/2011 | Shooshtari et al. |
| 2011/0060095 A1* | 3/2011 | Tutin .................. D04H 1/64 525/185 |
| 2011/0089074 A1 | 4/2011 | Jackson et al. |
| 2011/0135937 A1 | 6/2011 | Swift et al. |
| 2011/0190425 A1 | 8/2011 | Swift |
| 2011/0220835 A1 | 9/2011 | Swift et al. |
| 2011/0256790 A1 | 10/2011 | Toas et al. |
| 2011/0260094 A1 | 10/2011 | Hampson et al. |
| 2011/0262648 A1 | 10/2011 | Lee et al. |
| 2011/0263757 A1 | 10/2011 | Rand et al. |
| 2011/0306726 A1 | 12/2011 | Bailey et al. |
| 2012/0133073 A1 | 5/2012 | Pacorel et al. |
| 2012/0156954 A1 | 6/2012 | Eckert et al. |
| 2013/0029150 A1 | 1/2013 | Appley et al. |
| 2013/0032749 A1 | 2/2013 | Jaffrennou et al. |
| 2013/0047888 A1 | 2/2013 | Mueller et al. |
| 2013/0059075 A1 | 3/2013 | Appley et al. |
| 2013/0082205 A1 | 4/2013 | Mueller et al. |
| 2013/0174758 A1 | 7/2013 | Mueller |
| 2013/0234362 A1 | 9/2013 | Swift et al. |
| 2013/0236650 A1 | 9/2013 | Swift et al. |
| 2013/0237113 A1 | 9/2013 | Swift et al. |
| 2013/0244524 A1 | 9/2013 | Swift et al. |
| 2013/0323492 A1 | 12/2013 | Finch et al. |
| 2014/0091247 A1 | 4/2014 | Jackson et al. |
| 2014/0134909 A1 | 5/2014 | Guo et al. |
| 2014/0357787 A1 | 12/2014 | Jobber et al. |

FOREIGN PATENT DOCUMENTS

| | | |
|---|---|---|
| CA | 1090026 | 11/1980 |
| CA | 2037214 | 9/1991 |
| CA | 2232334 | 11/1998 |
| CA | 2458333 | 12/1999 |
| CA | 2278946 | 1/2000 |
| CA | 2470783 | 12/2004 |
| CN | 1251738 | 5/2000 |
| DE | 1905054 | 8/1969 |
| DE | 4142261 | 6/1993 |
| DE | 4233622 | 4/1994 |
| DE | 4308089 | 9/1994 |
| DE | 102004033561 | 9/2005 |
| DE | 102005023431 | 11/2006 |

(56) References Cited

FOREIGN PATENT DOCUMENTS

| | | |
|---|---|---|
| EP | 0044614 A2 | 1/1982 |
| EP | 0099801 | 2/1984 |
| EP | 354023 | 2/1990 |
| EP | 0375235 A1 | 6/1990 |
| EP | 0461995 | 12/1991 |
| EP | 0524518 A2 | 1/1993 |
| EP | 0547819 A2 | 6/1993 |
| EP | 0583086 A1 | 2/1994 |
| EP | 0714754 A2 | 6/1996 |
| EP | 796681 | 9/1997 |
| EP | 0826710 A2 | 3/1998 |
| EP | 856494 | 8/1998 |
| EP | 0873976 A1 | 10/1998 |
| EP | 878135 | 11/1998 |
| EP | 0882756 A2 | 12/1998 |
| EP | 0911361 A1 | 4/1999 |
| EP | 915811 | 5/1999 |
| EP | 936060 | 8/1999 |
| EP | 976866 | 2/2000 |
| EP | 0990729 A1 | 4/2000 |
| EP | 1038433 A1 | 9/2000 |
| EP | 1193288 A1 | 4/2002 |
| EP | 1084167 | 9/2002 |
| EP | 1268702 | 1/2003 |
| EP | 1382642 | 1/2004 |
| EP | 1486547 A2 | 12/2004 |
| EP | 1522642 | 4/2005 |
| EP | 1698598 A1 | 9/2006 |
| EP | 1767566 | 4/2007 |
| EP | 2223941 | 9/2010 |
| EP | 2253663 | 11/2010 |
| FR | 2614388 | 10/1988 |
| GB | 770561 | 3/1957 |
| GB | 809675 | 3/1959 |
| GB | 926749 | 5/1963 |
| GB | 1391172 | 4/1975 |
| GB | 1469331 | 4/1977 |
| GB | 1512066 | 5/1978 |
| GB | 1525541 | 9/1978 |
| GB | 2047258 | 11/1980 |
| GB | 2078805 A | 1/1982 |
| GB | 2173523 | 10/1986 |
| GB | 2251438 | 7/1992 |
| JP | 53113784 | 10/1978 |
| JP | 57101100 | 6/1982 |
| JP | 5811193 | 1/1983 |
| JP | 61195647 | 8/1986 |
| JP | 3-173680 | 7/1991 |
| JP | 05186635 | 7/1993 |
| JP | 7-034023 | 2/1995 |
| JP | 09157627 | 6/1997 |
| JP | 10234314 | 9/1998 |
| JP | 11035491 | 2/1999 |
| JP | 11181690 | 7/1999 |
| JP | 2000327841 | 11/2000 |
| JP | 2002293576 | 9/2002 |
| JP | 2003147276 | 5/2003 |
| JP | 2003238921 | 8/2003 |
| JP | 2004060058 | 2/2004 |
| JP | 2005306919 | 11/2005 |
| NZ | 549563 | 1/2008 |
| RU | 1765996 | 8/1995 |
| SU | 374400 | 3/1973 |
| WO | 1990007541 | 7/1990 |
| WO | 1992012198 | 7/1992 |
| WO | 1995034517 | 12/1995 |
| WO | 1997049646 | 12/1997 |
| WO | 1999036368 | 7/1999 |
| WO | 199947765 | 9/1999 |
| WO | 199960042 | 11/1999 |
| WO | 199960043 | 11/1999 |
| WO | 200058085 | 10/2000 |
| WO | 2001014491 | 3/2001 |
| WO | 2001059026 | 8/2001 |
| WO | 200200429 | 1/2002 |
| WO | 200206178 | 1/2002 |
| WO | 2003029496 | 4/2003 |
| WO | 2003071879 | 9/2003 |
| WO | 2003106561 | 12/2003 |
| WO | 2004007615 | 1/2004 |
| WO | 2004076734 | 9/2004 |
| WO | 2005087837 | 9/2005 |
| WO | 2006044302 | 4/2006 |
| WO | 2006136614 | 12/2006 |
| WO | 2007014236 | 2/2007 |
| WO | 2007024020 A1 | 3/2007 |
| WO | 2007050964 | 5/2007 |
| WO | 2007112335 | 10/2007 |
| WO | 2008089847 | 7/2008 |
| WO | 2008089851 | 7/2008 |
| WO | 2008141201 | 11/2008 |
| WO | 2009019235 | 2/2009 |
| WO | 2009129084 | 10/2009 |
| WO | 2010027937 | 3/2010 |
| WO | 2010139899 | 12/2010 |
| WO | 2011019590 | 2/2011 |
| WO | 2011019593 | 2/2011 |
| WO | 2011019597 | 2/2011 |
| WO | 2011019598 | 2/2011 |
| WO | 2011022224 | 2/2011 |
| WO | 2011022226 | 2/2011 |
| WO | 2011022227 | 2/2011 |
| WO | 2011138458 | 11/2011 |
| WO | 2011138459 | 11/2011 |
| WO | 2013150123 | 10/2013 |

OTHER PUBLICATIONS

Ames, J.M., "The Maillard Browning Reaction—an Update," Chemistry & Industry, No. 17, 1988, 4 pages.

"Gamma-aminopropyltrimethoxysilane, "Hawley's Condensed Chemical Dictionary, 14th Edition, John Wiley & Sons, Inc., 2002, 1 page.

Hodge, J.E., Chemistry of Browning Reactions in Model Systems, 1953, J. Agric. Food Chem., vol. 1, No. 15, pp. 928-943.

Agyei-Aye et al., "The Role of Anion in the Reaction of Reducing Sugars with Ammonium Salts," Carbohydrate Research 2002, 337: 2273-2277.

Laroque et al., "Kinetic study on the Maillard reaction. Consideration of sugar reactivity," Food Chemistry 2008, 111: 1032-1042.

Bjorksten et al., "Polyester Resin—Glass Fiber Laminates," Industrial and Engineering Chemistry (1954).

Dow Corning, "A Guide to Silane Solutions," 2005.

Knauf Data Sheet, 2006.

Molasses Corporation, United States Sugar Corporation, http://www.suga-lik.com/molasses/composition.html (Sep. 29, 2003).

Clamen, Guy, "Acrylic Thermosets: A Safe Alternative to Formaldehyde Resins," Nonwovens World, Apr.-May 2004, pp. 96-102.

Opposition to AU 2006272595, Amended Statement of Grounds and Particulars, issued from Australian Patent Office, Jul. 6, 2012, 22 pages.

Decision re Opposition to AU 2006272595, issued from Australian Patent Office, Aug. 14, 2015, 25 pages.

Opposition to EP 1732968, Notice of Opposition: Prior Art, Scope of the Patent, Reasons for the Opposition, issued from European Patent Office, Mar. 8, 2012, 18 pages.

Decision re Opposition to EP 1732968, issued from the European Patent Office, Nov. 14, 2014, 5 pages.

Opposition to EA 019802, submitted to Eurasian Patent Office on Dec. 26, 2014, 36 pages.

Decision re Opposition to EA 019802, issued by Eurasian Patent Office on Aug. 18, 2015, 15 pages.

Owens Corning Retiree Update: What Goes Around, Comes Around: A tale of Natural Binders, revised Mar. 20, 2013 p. 4.

A.P. Bryant, "The Terminology of Sugars," Industrial and Engineering Chemistry, vol. 26, No. 2, p. 231, Feb. 1934.

Food Flavor Chemistry, p. 162, Mar. 21, 2009 (English Abstract).

Viswanathan, T., "Chapter 28: Thermosetting Adhesive Resins from Whey and Whey Byproducts," in Adhesives from Renewable Resources, ACS Symposium Series, Hemingway, R.W., et al. (Eds.), American Chemical Society, Washington, DC (1989).

(56) References Cited

OTHER PUBLICATIONS

Viswanathan, T., and Richardson, T., "Thermosetting Adhesive Resins from Whey and Whey Byproducts," Ind. Eng. Chem. Prod. Res. Dev. 23:644-47, American Chemical Society, United States (1984).

Residential Energy Conservation: vol. 1, Congress of the U.S., Office of Technology Assessment (Ed.), 357 pages (Jan. 1, 1979).

Office action for co-pending U.S. Appl. No. 12/524,502 (9 pages)—Sep. 21, 2012.

Office action for co-pending U.S. Appl. No. 12/524,502 (9 pages)—Apr. 4, 2013.

Office action for co-pending U.S. Appl. No. 12/524,512 (7 pages)—Aug. 6, 2012.

Office action for co-pending U.S. Appl. No. 12/524,512 (9 pages)—Apr. 1, 2013.

Office action for co-pending U.S. Appl. No. 12/524,512 (14 pages)—Nov. 12, 2014.

Office action for co-pending U.S. Appl. No. 12/524,512 (9 pages)—Jul. 10, 2015.

Office action for co-pending U.S. Appl. No. 12/524,512 (10 pages)—Mar. 23, 2016.

Office action for co-pending U.S. Appl. No. 12/524,512 (13 pages)—Oct. 5, 2016.

Office action for co-pending U.S. Appl. No. 12/524,512 (13 pages)—Apr. 6, 2018.

Office action for co-pending U.S. Appl. No. 12/524,512 (15 pages)—Jan. 17, 2019.

Office action for co-pending U.S. Appl. No. 12/524,469 (7 pages)—Jun. 7, 2012.

Office action for co-pending U.S. Appl. No. 12/524,469 (8 pages)—Jan. 29, 2013.

Office action for co-pending U.S. Appl. No. 12/524,469 (7 pages)—Aug. 20, 2013.

Office action for co-pending U.S. Appl. No. 12/524,469 (9 pages)—Jun. 9, 2014.

Office action for co-pending U.S. Appl. No. 12/524,469 (9 pages)—Oct. 17, 2014.

Office action for co-pending U.S. Appl. No. 12/524,469 (9 pages)—Jul. 23, 2015.

Office action for co-pending U.S. Appl. No. 12/524,539 (13 pages)—Jun. 21, 2012.

Office action for co-pending U.S. Appl. No. 12/524,539 (13 pages)—Jun. 6, 2013.

Office action for co-pending U.S. Appl. No. 12/524,539 (12 pages)—Dec. 17, 2014.

Office action for co-pending U.S. Appl. No. 12/524,539 (7 pages)—Jul. 15, 2015.

Office action for co-pending U.S. Appl. No. 12/524,539 (7 pages)—Mar. 23, 2016.

Office action for co-pending U.S. Appl. No. 12/524,539 (7 pages)—Dec. 29, 2016.

Office action for co-pending U.S. Appl. No. 12/524,522 (4 pages)—Oct. 11, 2011.

Office action for co-pending U.S. Appl. No. 12/667,718 (5 pages)—Sep. 3, 2013.

Office action for co-pending U.S. Appl. No. 12/667,718 (6 pages)—Sep. 9, 2014.

Office action for co-pending U.S. Appl. No. 12/671,922 (10 pages)—Oct. 7, 2011.

Office action for co-pending U.S. Appl. No. 12/671,922 (10 pages)—May 10, 2012.

Office action for co-pending U.S. Appl. No. 12/671,922 (9 pages)—Sep. 23, 2014.

Office action for co-pending U.S. Appl. No. 12/671,922 (5 pages)—Apr. 4, 2016.

Office action for co-pending U.S. Appl. No. 13/388,408 (5 pages)—Aug. 15, 2013.

Office action for co-pending U.S. Appl. No. 13/371,829 (9 pages)—Dec. 20, 2012.

Office action for co-pending U.S. Appl. No. 13/371,829 (6 pages)—Jul. 12, 2013.

Office action for co-pending U.S. Appl. No. 13/371,829 (6 pages)—Aug. 12, 2014.

Office action for co-pending U.S. Appl. No. 13/637,794 (8 pages)—Aug. 12, 2013.

Office action for co-pending U.S. Appl. No. 13/637,794 (9 pages)—Mar. 26, 2014.

Office action for co-pending U.S. Appl. No. 13/696,439 (11 pages)—Jan. 8, 2014.

Office action for co-pending U.S. Appl. No. 13/696,452 (7 pages)—Jan. 13, 2015.

Office action for co-pending U.S. Appl. No. 13/696,452 (9 pages)—Oct. 27, 2015.

Office action for co-pending U.S. Appl. No. 13/702,144 (6 pages)—Jan. 10, 2014.

Office action for co-pending U.S. Appl. No. 13/702,144 (7 pages)—Jul. 29, 2014.

Office action for co-pending U.S. Appl. No. 13/823,818 (9 pages)—Mar. 26, 2015.

Office action for co-pending U.S. Appl. No. 13/866,368 (16 pages)—Aug. 29, 2013.

Office action for co-pending U.S. Appl. No. 13/866,368 (11 pages)—Apr. 16, 2014.

Office action for co-pending U.S. Appl. No. 13/866,368 (8 pages)—Aug. 21, 2014.

Office action for co-pending U.S. Appl. No. 13/866,419 (14 pages)—Sep. 20, 2013.

Office action for co-pending U.S. Appl. No. 13/866,419 (10 pages)—Apr. 25, 2014.

Office action for co-pending U.S. Appl. No. 13/866,419 (8 pages)—Oct. 9, 2014.

Office action for co-pending U.S. Appl. No. 13/866,419 (8 pages)—Sep. 25, 2015.

Office action for co-pending U.S. Appl. No. 13/868,233 (23 pages)—Aug. 13, 2013.

Office action for co-pending U.S. Appl. No. 13/868,233 (12 pages)—Apr. 15, 2014.

Office action for co-pending U.S. Appl. No. 13/868,233 (8 pages)—Oct. 7, 2014.

Office action for co-pending U.S. Appl. No. 13/868,233 (8 pages)—Jul. 16, 2015.

Office action for co-pending U.S. Appl. No. 13/868,238 (8 pages)—Jul. 16, 2014.

Office action for co-pending U.S. Appl. No. 12/976,379 (7 pages)—Jan. 10, 2012.

Office action for co-pending U.S. Appl. No. 12/976,379 (6 pages)—Jul. 27, 2012.

Office action for co-pending U.S. Appl. No. 12/976,379 (9 pages)—Mar. 7, 2013.

Office action for co-pending U.S. Appl. No. 12/976,379 (8 pages)—Aug. 20, 2013.

Office action for co-pending U.S. Appl. No. 12/599,858 (8 pages)—May 11, 2011.

Office action for co-pending U.S. Appl. No. 13/341,542 (8 pages)—Dec. 26, 2012.

Office action for co-pending U.S. Appl. No. 13/341,542 (7 pages)—Feb. 10, 2014.

Office action for co-pending U.S. Appl. No. 14/026,394 (6 pages)—Aug. 14, 2014.

Office action for co-pending U.S. Appl. No. 14/272,556 (14 pages)—Nov. 20, 2014.

Office action for co-pending U.S. Appl. No. 14/272,556 (12 pages)—Sep. 17, 2015.

Office action for co-pending U.S. Appl. No. 14/342,069 (17 pages)—Dec. 29, 2015.

Office action for co-pending U.S. Appl. No. 14/342,069 (22 pages)—Sep. 2, 2016.

Office action for co-pending U.S. Appl. No. 14/342,069 (21 pages)—Sep. 26, 2017.

Office action for co-pending U.S. Appl. No. 14/342,069 (21 pages)—Jun. 6, 2018.

(56) References Cited

OTHER PUBLICATIONS

Office action for co-pending U.S. Appl. No. 14/390,445 (14 pages)—Dec. 3, 2015.
Office action for co-pending U.S. Appl. No. 14/649,277 (9 pages)—Jul. 22, 2016.
Office action for co-pending U.S. Appl. No. 14/686,915 (8 pages)—Nov. 18, 2016.
Office action for co-pending U.S. Appl. No. 14/810,765 (7 pages)—Jan. 29, 2016.
Office action for co-pending U.S. Appl. No. 14/828,916 (8 pages)—Nov. 25, 2016.
Office action for co-pending U.S. Appl. No. 14/867,502 (9 pages)—Nov. 18, 2016.
Office action for co-pending U.S. Appl. No. 15/172,432 (16 pages)—Apr. 17, 2017.
Office action for co-pending U.S. Appl. No. 15/702,087 (5 pages)—Nov. 9, 2018.
Office action for co-pending U.S. Appl. No. 15/177,442 (17 pages)—May 19, 2017.
Office action for co-pending U.S. Appl. No. 15/378,159 (18 pages)—Mar. 2, 2017.
Office action for co-pending U.S. Appl. No. 15/222,122 (8 pages)—Nov. 20, 2017.
Office action for co-pending U.S. Appl. No. 15/310,837 (13 pages)—Jun. 21, 2018.
Office action for co-pending U.S. Appl. No. 15/411,972 (9 pages)—Mar. 28, 2017.
Office action for co-pending U.S. Appl. No. 15/411,972 (8 pages)—Nov. 29, 2017.
Office action for co-pending U.S. Appl. No. 15/411,972 (9 pages)—Jun. 14, 2018.
Office action for co-pending U.S. Appl. No. 15/116,254 (8 pages)—Apr. 26, 2018.
Office action for co-pending U.S. Appl. No. 15/116,254 (10 pages)—Aug. 15, 2018.
Office action for co-pending U.S. Appl. No. 15/116,254 (12 pages)—Nov. 3, 2021.
Office action for co-pending U.S. Appl. No. 15/333,670 (5 pages)—Dec. 8, 2017.
Office Action for co-pending U.S. Appl. No. 14/116,048 (10 pages)—Jun. 23, 2017.
Office action for co-pending U.S. Appl. No. 15/959,131 (8 pages)—Nov. 8, 2019.
Office action for co-pending U.S. Appl. No. 15/822,102 (6 pages)—Dec. 6, 2019.
Office action for co-pending U.S. Appl. No. 15/690,623 (7 pages)—May 24, 2019.
Office action for co-pending U.S. Appl. No. 15/690,623 (6 pages)—Jan. 9, 2020.
Office action for co-pending U.S. Appl. No. 16/357,320 (7 pages)—Jun. 10, 2021.
Office action for co-pending U.S. Appl. No. 16/357,320 (9 pages)—Dec. 29, 2021.
Office action for co-pending U.S. Appl. No. 16/357,320 (9 pages)—Apr. 14, 2022.
Other Information—Narrative of verbal disclosure of Brian Swift (1 page)—May 13, 2014.
Petition for Inter Partes Review of U.S. Pat. No. 8,114,210 (52 pages, filed Jun. 12, 2015 by Petitioners Johns Manville Corporation and Johns Manville, Inc.).
Declaration of Dr. Frederick J. Hirsekorn Regarding U.S. Pat. No. 8,114,210 (58 pages, filed Jun. 12, 2015 by Petitioners Johns Manville Corporation and Johns Manville, Inc. in connection with Petition for Inter Partes Review of U.S. Pat. No. 8,114,210).
1st Petition for Inter Partes Review of U.S. Pat. No. D631,670 (68 pages, filed Jun. 19, 2015 by Petitioners Johns Manville Corporation and Johns Manville, Inc.).
2nd Petition for Inter Partes Review of U.S. Pat. No. D631,670 (62 pages, filed Nov. 2, 2015 by Petitioners Johns Manville Corporation and Johns Manville, Inc.).
Decision of PTAB regarding Institution of Inter Partes Review for U.S. Pat. No. D631,670 (33 pages)—Jan. 12, 2016.
Decision2 of PTAB regarding Institution of Inter Partes Review for U.S. Pat. No. D631,670 (27 pages)—May 9, 2016.
Final Written Decision of PTAB regarding Inter Partes Review of U.S. Pat. No. D631,670 based on 1st Petition (56 pages)—Jan. 11, 2017.
Final Written Decision of PTAB regarding Inter Partes Review of U.S. Pat. No. D631,670 based on 2nd Petition (55 pages)—May 8, 2017.
Court of Appeals for Federal Circuit Judgment from Appeal of PTAB Decisions in Inter Partes Reviews of U.S. Pat. No. D631,670 (2 pages)—Jul. 13, 2018.
1st Petition for Inter Partes Review of U.S. Pat. No. 8,940,089 (61 pages, filed Jul. 1, 2015 by Petitioners Johns Manville Corporation and Johns Manville, Inc.).
Declaration of Dr. Frederick J. Hirsekorn Regarding U.S. Pat. No. 8,940,089 (70 pages, filed Jul. 1, 2015 by Petitioners Johns Manville Corporation and Johns Manville, Inc. in connection with 1st Petition for Inter Partes Review of U.S. Pat. No. 8,940,089).
2nd Petition for Inter Partes Review of U.S. Pat. No. 8,940,089 (56 pages, filed Jul. 10, 2015 by Petitioners Johns Manville Corporation and Johns Manville, Inc.).
Declaration of Dr. Frederick J. Hirsekorn Regarding U.S. Pat. No. 8,940,089 (67 pages, filed Jul. 10, 2015 by Petitioners Johns Manville Corporation and Johns Manville, Inc. in connection with 2nd Petition for Inter Partes Review of U.S. Pat. No. 8,940,089).
3rd Petition for Inter Partes Review of U.S. Pat. No. 8,940,089 (62 pages, filed Jul. 17, 2015 by Petitioners Johns Manville Corporation and Johns Manville, Inc.).
Declaration of Dr. Frederick J. Hirsekorn Regarding U.S. Pat. No. 8,940,089 (76 pages, filed Jul. 17, 2015 by Petitioners Johns Manville Corporation and Johns Manville, Inc. in connection with 3rd Petition for Inter Partes Review of U.S. Pat. No. 8,940,089).
Declaration of Dr. Elam Leed (11 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
Declaration of Dr. Jonathan Vickers (10 pages, filed Jul. 1, Jul. 10, and Jul. 17, 2015 by Petitioners Johns Manville Corporation and Johns Manville, Inc. in connection with 1st, 2nd and 3rd Petition for Inter Partes Review of U.S. Pat. No. 8,940,089, respectively).
1st Petition for Inter Partes Review of U.S. Pat. No. 9,039,827 (60 pages, filed Jul. 29, 2015 by Petitioners Johns Manville Corporation and Johns Manville, Inc.).
Declaration of Dr. Frederick J. Hirsekorn Regarding U.S. Pat. No. 9,039,827 (72 pages, filed Jul. 29, 2015 by Petitioners Johns Manville Corporation and Johns Manville, Inc. in connection with $1^{st}$ Petition for Inter Partes Review of U.S. Pat. No. 9,039,827).
2nd Petition for Inter Partes Review of U.S. Pat. No. 9,039,827 (51 pages, filed Aug. 5, 2015 by Petitioners Johns Manville Corporation and Johns Manville, Inc.).
Declaration of Dr. Frederick J. Hirsekorn Regarding U.S. Pat. No. 9,039,827 (65 pages, filed Aug. 5, 2015 by Petitioners Johns Manville Corporation and Johns Manville, Inc. in connection with $2^{nd}$ Petition for Inter Partes Review of U.S. Pat. No. 9,039,827).
3rd Petition for Inter Partes Review of U.S. Pat. No. 9,039,827 (57 pages, filed Aug. 7, 2015 by Petitioners Johns Manville Corporation and Johns Manville, Inc.).
Declaration of Dr. Frederick J. Hirsekorn Regarding U.S. Pat. No. 9,039,827 (75 pages, filed Aug. 7, 2015 by Petitioners Johns Manville Corporation and Johns Manville, Inc. in connection with 3rd Petition for Inter Partes Review of U.S. Pat. No. 9,039,827).
Declaration of Dr. Elam Leed (11 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).
Declaration of Dr. Jonathan Vickers (10 pages, filed Jul. 29, Aug. 5, and Aug. 7, 2015 by Petitioners Johns Manville Corporation and Johns Manville, Inc. in connection with 1st, 2nd and 3rd Petition for Inter Partes Review of U.S. Pat. No. 9,039,827, respectively).

(56) References Cited

OTHER PUBLICATIONS

Petition for Inter Partes Review of U.S. Pat. No. 9,469,747 (67 pages, filed Mar. 20, 2018 by Petitioners Johns Manville Corporation and Johns Manville, Inc.).
Petition for Inter Partes Review of U.S. Pat. No. 9,828,287 (86 pages, filed Mar. 23, 2018 by Petitioners Johns Manville Corporation and Johns Manville, Inc.).
Petition for Inter Partes Review of U.S. Pat. No. 9,464,207 (78 pages, filed Mar. 28, 2018 by Petitioners Johns Manville Corporation and Johns Manville, Inc.).
Petition for Inter Partes Review of U.S. Pat. No. 9,926,464 (74 pages, filed Mar. 30, 2018 by Petitioners Johns Manville Corporation and Johns Manville, Inc.).
Office Action Granting Ex Parte Reexamination of U.S. Pat. No. 7,888,445, mailed Dec. 24, 2013, in Control No. 90/013,029, 11 pages.
Office Action Granting Ex Parte Reexamination of U.S. Pat. No. 7,772,347, mailed Dec. 24, 2013, in Control No. 90/013,030, 14 pages.
Office Action Granting Ex Parte Reexamination of U.S. Pat. No. 7,854,980, mailed Apr. 15, 2014, in Control No. 90/013,156, 20 pages.
Declaration of Jan Rud Andersen submitted in Ex parte Reexamination Control No. 90/013,030, as Document OTH-C, Oct. 10, 2013, 4 pages.
Final Rejection in Ex Parte Reexamination of U.S. Pat. No. 7,888,445 (20 pages)—Jul. 24, 2015.
Final Rejection in Ex Parte Reexamination of U.S. Pat. No. 7,772,347 (23 pages)—Jul. 24, 2015.
Final Rejection in Ex Parte Reexamination of U.S. Pat. No. 7,854,980 (31 pages)—Aug. 18, 2015.
Advisory Action in Ex Parte Reexamination of U.S. Pat. No. 7,888,445 (4 pages)—Oct. 6, 2015.
Advisory Action in Ex Parte Reexamination of U.S. Pat. No. 7,772,347 (4 pages)—Oct. 6, 2015.
Advisory Action in Ex Parte Reexamination of U.S. Pat. No. 7,854,980 (4 pages) - Nov. 18, 2015.
Examiner's Answer in Ex Parte Reexamination of U.S. Pat. No. 7,888,445 (8 pages)—Mar. 23, 2016.
Examiner's Answer in Ex Parte Reexamination of U.S. Pat. No. 7,772,347 (8 pages)—Mar. 23, 2016.
Examiner's Answer in Ex Parte Reexamination of U.S. Pat. No. 7,854,980 (8 pages)—Mar. 22, 2016.
Decision of PTAB in Ex Parte Reexamination of U.S. Pat. No. 7,888,445 (17 pages)—Sep. 29, 2016.
Decision of PTAB in Ex Parte Reexamination of U.S. Pat. No. 7,772,347 (18 pages)—Sep. 29, 2016.
Decision of PTAB in Ex Parte Reexamination of U.S. Pat. No. 7,854,980 (22 pages)—Sep. 30, 2016.
Court of Appeals for Federal Circuit Judgment from Consolidated Appeal of PTAB Decisions in Ex Parte Reexamination of U.S. Pat. Nos. 7,888,445, 7,772,347 and 7,854,980 (5 pages)—Mar. 9, 2018.
Notice of Intent to Issue Ex Parte Reexamination Certificate for U.S. Pat. No. 7,772,347 (4 pages)—Oct. 24, 2018.
Notice of Intent to Issue Ex Parte Reexamination Certificate for U.S. Pat. No. 7,888,445 (4 pages)—Dec. 7, 2018.
Notice of Intent to Issue Inter Partes Reexamination Certificate for U.S. Pat. No. 7,888,445 (14 pages)—Sep. 24, 2020.
Notice of Intent to Issue Inter Partes Reexamination Certificate for U.S. Pat. No. 7,772,347 (13 pages)—Sep. 25, 2020.
Decision of USPTO to Reopen Prosecution in Ex Parte Reexamination of U.S. Pat. No. 7,854,980 (7 pages)—Jan. 7, 2019.
Non-final Office Action from Reopened Prosecution in Ex Parte Reexamination of U.S. Pat. No. 7,854,980 (26 pages)—Apr. 3, 2019.
Final Office Action from Reopened Prosecution in Ex Parte Reexamination of U.S. Pat. No. 7,854,980 (11 pages)—Aug. 8, 2019.
Notice of Intent to Issue Ex Parte Reexamination Certificate for U.S. Pat. No. 7,854,980 (3 pages)—Oct. 29, 2019.
Notice of Intent to Issue Inter Partes Reexamination Certificate for U.S. Pat. No. 7,807,771 (4 pages)—Jan. 30, 2014.
Notice of Intent to Issue Inter Partes Reexamination Certificate for U.S. Pat. No. 7,854,980 (6 pages)—Aug. 31, 2017.
Decision of PTAB in Inter Partes Reexamination of U.S. Pat. No. 7,888,445 (34 pages)—May 1, 2015.
Decision of PTAB in Inter Partes Reexamination of U.S. Pat. No. 7,772,347 (36 pages)—May 1, 2015.
Decision of PTAB in Inter Partes Reexamination of U.S. Pat. No. 7,854,980 (25 pages)—Jul. 30, 2015.
Remand Order of PTAB in Inter Partes Reexamination of U.S. Pat. No. 7,888,445 (5 pages)—Dec. 9, 2015.
Remand Order of PTAB in Inter Partes Reexamination of U.S. Pat. No. 7,772,347 (5 pages)—Dec. 9, 2015.
Examiner's Determination on Patent Owner Response/Requester Comments after Board Decision in Inter Partes Reexamination of U.S. Pat. No. 7,888,445 (22 pages)—Oct. 17, 2016.
Examiner's Determination on Patent Owner Response/Requester Comments after Board Decision in Inter Partes Reexamination of U.S. Pat. No. 7,772,347 (17 pages)—Oct. 17, 2016.
Court of Appeals for Federal Circuit Opinion/Judgment from Appeal of PTAB Decision in Inter Partes Reexamination of U.S. Pat. No. 7,854,980 (13 pages)—Feb. 27, 2017.
Final Decision of PTAB in Inter Partes Reexamination of U.S. Pat. No. 7,888,445 (25 pages)—Sep. 8, 2017.
Final Decision of PTAB in Inter Partes Reexamination of U.S. Pat. No. 7,772,347 (24 pages)—Sep. 8, 2017.
Decision of PTAB re Request for Rehearing in Inter Partes Reexamination of U.S. Pat. No. 7,888,445 (7 pages)—Feb. 12, 2018.
Decision of PTAB re Request for Rehearing in Inter Partes Reexamination of U.S. Pat. No. 7,772,347 (7 pages)—Feb. 12, 2018.
Court of Appeals for Federal Circuit Decision re Consolidated Appeal of PTAB Decision in Inter Partes Reexamination of U.S. Pat. No. 7,772,347 and U.S. Pat. No. 7,888,445 (14 pages)—Oct. 15, 2019.
Remand Order of PTAB in Inter Partes Reexamination of U.S. Pat. No. 7,888,445 (3 pages)—Jul. 1, 2020.
Remand Order of PTAB in Inter Partes Reexamination of U.S. Pat. No. 7,772,347 (3 pages)—Jul. 1, 2020.
Decision of USPTO Granting Ex Parte Re-exam of U.S. Pat. No. 8,114,210 (11 pages)—Apr. 9, 2020.
Decision1 of PTAB declining Institution of Inter Partes Review for U.S. Pat. No. 8,940,089 (16 pages)—Dec. 17, 2015.
Decision2 of PTAB declining Institution of Inter Partes Review for U.S. Pat. No. 8,940,089 (19 pages)—Dec. 17, 2015.
Decision3 of PTAB declining Institution of Inter Partes Review for U.S. Pat. No. 8,940,089 (14 pages)—Dec. 17, 2015.
Decision1 of PTAB declining Institution of Inter Partes Review for U.S. Pat. No. 9,039,827 (16 pages)—Jan. 4, 2016.
Decision2 of PTAB declining Institution of Inter Partes Review for U.S. Pat. No. 9,039,827 (19 pages)—Jan. 4, 2016.
Decision3 of PTAB declining Institution of Inter Partes Review for U.S. Pat. No. 9,039,827 (14 pages)—Jan. 4, 2016.
Decision of PTAB denying Institution of Inter Partes Review for U.S. Pat. No. 9,926,464 (29 pages)—Oct. 2, 2018.
Decision of PTAB denying Institution of Inter Partes Review for U.S. Pat. No. 9,464,207 (28 pages)—Oct. 2, 2018.
Decision of PTAB denying Institution of Inter Partes Review for U.S. Pat. No. 9,469,747 (29 pages)—Oct. 3, 2018.
Decision of PTAB denying Institution of Inter Partes Review for U.S. Pat. No. 9,828,287 (22 pages)—Oct. 16, 2018.
Decision of USPTO Granting Ex Parte Re-exam of U.S. Pat. No. 9,828,287 (13 pages)—Jul. 17, 2020.
Decision of USPTO Granting Ex Parte Re-exam of U.S. Pat. No. 9,464,207 (14 pages)—Jul. 31, 2020.
Decision of USPTO Granting Ex Parte Re-exam of U.S. Pat. No. 9,926,464 (18 pages)—Aug. 5, 2020.
Decision of USPTO Granting Ex Parte Re-exam of U.S. Pat. No. 8,940,089 (17 pages)—Oct. 16, 2020.
Decision of USPTO Granting Ex Parte Re-exam of U.S. Pat. No. 9,039,827 (16 pages)—Oct. 16, 2020.
Decision of USPTO Granting Ex Parte Re-exam of U.S. Pat. No. 9,469,747 (16 pages)—Nov. 9, 2020.

(56) References Cited

OTHER PUBLICATIONS

Decision of USPTO Granting Ex Parte Re-exam of U.S. Pat. No. 9,464,207 (19 pages)—Aug. 27, 2021.
Office Action in Ex Parte Reexamination of U.S. Pat. No. 9,464,207 (14 pages)—Sep. 9, 2022.
Notice of Intent to Issue Ex Parte Re-examination Certificate re U.S. Pat. No. 9,464,207 (9 pages)—Jun. 8, 2023.
Decision of USPTO Granting Ex Parte Re-exam of U.S. Pat. No. 9,926,464 (16 pages)—Sep. 7, 2021.
Office Action in Ex Parte Reexamination of U.S. Pat. No. 9,926,464 (15 pages)—Mar. 21, 2023.
Notice of Intent to Issue Ex Parte Re-examination Certificate re U.S. Pat. No. 9,926,464 (6 pages)—Jul. 25, 2023.
Decision of USPTO Granting Ex Parte Re-exam of U.S. Pat. No. 9,469,747 (10 pages)—Sep. 16, 2021.
Office Action in Ex Parte Reexamination of U.S. Pat. No. 9,469,747 (9 pages)—Feb. 28, 2023.
Notice of Intent to Issue Ex Parte Re-examination Certificate re U.S. Pat. No. 9,469,747 (6 pages)—Jul. 25, 2023.
Decision of USPTO Granting Ex Parte Re-exam of U.S. Pat. No. 8,114,210 (13 pages)—Dec. 1, 2021.
Office Action in Ex Parte Reexamination of U.S. Pat. No. 8,114,210 (11 pages)—Mar. 27, 2023.
Notice of Intent to Issue Ex Parte Re-examination Certificate re U.S. Pat. No. 8,114,210 (6 pages)—Aug. 8, 2023.
Decision of USPTO Granting Ex Parte Re-exam of U.S. Pat. No. 8,940,089 (13 pages)—Jan. 28, 2022.
Office Action in Ex Parte Reexamination of U.S. Pat. No. 8,940,089 (11 pages)—Jul. 17, 2023.
Decision of USPTO Granting Ex Parte Re-exam of U.S. Pat. No. 9,828,287 (11 pages)—Feb. 1, 2022.
Office Action in Ex Parte Reexamination of U.S. Pat. No. 9,828,287 (9 pages)—Feb. 28, 2023.
Notice of Intent to Issue Ex Parte Re-examination Certificate re U.S. Pat. No. 9,828,287 (6 pages)—Jul. 25, 2023.
Decision of USPTO Granting Ex Parte Re-exam of U.S. Pat. No. 9,039,827 (13 pages)—Feb. 1, 2022.
Office Action in Ex Parte Reexamination of U.S. Pat. No. 9,039,827 (11 pages)—Aug. 16, 2023.
Notice of Intent to Issue Ex Parte Reexamination Certificate for U.S. Pat. No. 8,114,210 (4 pages)—May 27, 2021.
Notice of Intent to Issue Ex Parte Reexamination Certificate for U.S. Pat. No. 9,464,207 (4 pages)—Apr. 19, 2021.
Notice of Intent to Issue Ex Parte Reexamination Certificate for U.S. Pat. No. 9,828,287 (5 pages)—May 5, 2021.
Notice of Intent to Issue Ex Parte Reexamination Certificate for U.S. Pat. No. 9,926,464 (5 pages)—May 5, 2021.
Notice of Intent to Issue Ex Parte Reexamination Certificate for U.S. Pat. No. 9,469,747 (8 pages)—May 21, 2021.
Notice of Intent to Issue Ex Parte Reexamination Certificate for U.S. Pat. No. 9,039,827 (3 pages)—Jul. 2, 2021.
Notice of Intent to Issue Ex Parte Reexamination Certificate for U.S. Pat. No. 8,940,089 (4 pages)—Jul. 13, 2021.
Petition for Post Grant Review of U.S. Pat. No. 10,968,629 (50 pages, filed Jan. 6, 2022 by Petitioner Rockwool International A/S).
Denial of Petition for Post Grant Review of U.S. Pat. No. 10,968,629 entered by Patent Trial and Appeal Board (19 pages)—Jul. 6, 2022.
Statement of Revocation Grounds re GB2496951-Claimant Rockwool International (May 21, 2018, 22 pages).
Statement of Revocation Grounds re GB2451719-Claimant Rockwool International (May 18, 2018, 22 pages).
Expert Report re Revocation of GB2451719 and GB2496951-Claimant Rockwool International (Nov. 12, 2018, 11 pages).
United Kingdom Intellectual Property Office, Decision in *Rockwool International* v. *Knauf Insulation Limited*, Application under Section 72 for revocation of patents GB2451719 and GB2496951 (May 28, 2019—18 pages).
Decision of EPO Board of Appeal re Added Matter vis-à-vis EP06788492.4 (Jul. 17, 2019—14 pages).
U.S. Pat. No. 2,965,504—Part 1 (10 pages).
U.S. Pat. No. 2,965,504—Part 2 (14 pages).
U.S. Pat. No. 2,965,504—Part 3 (14 pages).
Gogek Attorney Comments re U.S. Pat. No. 2,965,504—Apr. 6, 1960 (3 pages).
Gogek Affidavit Under Rule 132 re U.S. Pat. No. 2,965,504—Feb. 26, 1960 (3 pages).
Notice of Intent to Issue Ex Parte Re-examination Certificate re U.S. Pat. No. 8,940,089 (6 pages)—Jan. 8, 2024.
Notice of Intent to Issue Ex Parte Re-examination Certificate re U.S. Pat. No. 9,039,827 (6 pages)—Jan. 9, 2024.
Knauf_JM_Litigation-Markman_Summary_Judgment_Order (124 pages)—Mar. 28, 2024.
Knauf_JM_Litigation-Denial_re_Knauf_Motion_to_Reconsider (24 pages)—Jun. 24, 2024.

* cited by examiner

| HMDA 7030 (70% Binder Solids/30% HMDA) | pH | Viscosity | Viscosity | Viscosity | Viscosity | Viscosity | Viscosity | Viscosity | Viscosity | Viscosity |
|---|---|---|---|---|---|---|---|---|---|---|
| Storage time (days) | | 1 | 4 | 9 | 14 | 18 | 22 | 25 | 29 | 35 |
| Untreated Sample | 11.5 | 1,700 | 3,500 | Gel | Gel | Gel | Gel | Gel | Gel | Gel |
| 30' Sample | 10.0 | 1,800 | 2,500 | 3,000 | 4,300 | Gel | Gel | Gel | Gel | Gel |
| 60' Sample | 9.8 | 1,800 | 2,300 | 2,600 | 4,100 | 8,400 | Gel | Gel | Gel | Gel |
| 150' Sample | 9.5 | 1,900 | 2,200 | 2,600 | 3,700 | 4,200 | 8,000 | >10³ | Gel | Gel |
| 240' Sample | 9.0 | 2,000 | 2,100 | 2,600 | 3,100 | 3,300 | 3,900 | 4,600 | 5,600 | 11,400 |

BINDER COMPOSITIONS AND USES THEREOF

CROSS-REFERENCE TO RELATED APPLICATIONS

This application is a continuation of U.S. application Ser. No. 17/041,892, filed Sep. 25, 2020, which is a U.S. national counterpart application of International Application Serial No. PCT/EP2019/057803, filed Mar. 27, 2019, under 35 U.S.C. § 371, which claims priority to GB Application Ser. No. 1804908.0, filed Mar. 27, 2018, and to U.S. Application Ser. No. 62/662,494, filed Apr. 25, 2018, the disclosures of which are hereby incorporated herein by reference.

FIELD OF THE INVENTION

The present invention relates to binder compositions and uses thereof.

More specifically the present invention relates to curable binder composition for use in manufacturing composite products from non or loosely assembled matter and to methods of manufacturing a composite product.

SUMMARY

In accordance with one aspect, the present invention provides a method of manufacturing a composite product comprising:
applying a binder composition, notably in the form of an aqueous solution, to non or loosely assembled matter to provide resinated matter, wherein the binder composition consists of a binder composition prepared by combining i) Maillard reactants selected from: reducing sugar reactant(s) and nitrogen-containing reactant(s); curable reaction product(s) of reducing sugar reactant(s) and nitrogen-containing reactant(s); and combinations thereof; and ii) a resin; reactants of a resin; and combinations thereof;
arranging the resinated matter to provide loosely arranged resinated matter; and
subjecting the loosely arranged resinated matter to heat and/or pressure to cure the binder composition and to form the composite product.

In accordance with another aspect, the present invention provides a binder composition consisting of a binder composition prepared by combining i) Maillard reactants selected from: reducing sugar reactant(s) and nitrogen-containing reactant(s); curable reaction product(s) of reducing sugar reactant(s) and nitrogen-containing reactant(s); and combinations thereof; and ii) a resin; reactants of a resin; and combinations thereof.

DETAILED DESCRIPTION

Figure 1:
FIG. 1 shows 4-(aminomethyl)-1,8-octanediamine.

Preparation of the binder composition may comprise combining reactants comprising at least 15% by dry weight reducing sugar reactant(s) and at least 2% by dry weight nitrogen-containing reactant(s), notably wherein the nitrogen-containing reactant(s) comprise TPTA triprimary triamine(s), notably wherein the nitrogen-containing reactant(s) comprise at least 5% by dry weight of TPTA triprimary triamine(s).

As used herein, the term "TPTA triprimary triamine(s)" means triprimary triamine(s) selected from:
triprimary triamine(s) having spacer groups between each of the three primary amines which consist of carbon chains;
triprimary triamine(s) having spacer groups between each of the three primary amines wherein each spacer group has a spacer length which is less than or equal to 12 polyvalent atoms; and
triprimary triamine(s) having a total number of polyvalent atoms which is less than or equal to 23.

Any feature described herein in relation to a particular aspect of the invention may be used in relation to any other aspect of the invention.

The non or loosely assembled matter may comprise woven or non-woven fiber material. The non or loosely assembled matter may be selected from fibers, notably selected from inorganic fibers, man-made organic fibers, mineral fibers, stone fibers, glass fibers, aramid fibers, ceramic fibers, metal fibers, carbon fibers, polyimide fibers, polyester fibers, rayon fibers, cellulosic fibers and combinations thereof. The non or loosely assembled matter may be selected from particulates, notably selected from inorganic particles, sand, coal. The non or loosely assembled matter may be selected from flakes, wood shavings, saw dust, wood pulp, paper pulp, ground wood, wood chips, wood strands, wood layers; other natural fibers, such as jute, flax, hemp, straw, and wood veneers, and combinations thereof.

In a preferred embodiment, the composite product is selected from corrugated cardboard, a corrugated board, a corrugated fiberboard, a corrugated box and a cellulosic fiber composition (notably a paper product or a cardboard product). Notably in such cases, the binder composition may be used to bond corrugated flutes to a liner board or liner paper. The composite product may be mineral fiber insulation product, for example glass fiber mat or stone fiber mat. The composite products may be a mineral fiber veil, e.g. glass fiber veil, which may then find application for example in battery separators, as substrate for roofing products, as roofing membranes, as shingles, or as other membranes. The composite product may be prepregs, high pressure laminates, refractory bricks, foundry sands, brake pads or corrugated cardboard. The composite product may be wood board, notably a particle board; an oriented strand board (OSB), plywood or a medium density fiberboard (MDF).

The term "binder composition" as used herein means all ingredients that will be applied to the non or loosely assembled matter and/or present on the non or loosely assembled matter, notably prior to curing, (other than the non or loosely assembled matter itself and any moisture in the non or loosely assembled matter), including reactants, solvents (including water) and additives. The term "dry weight of the binder composition" as used herein means the weight of all components of the binder composition other than any water that is present (whether in the form of liquid water or in the form of water of crystallization). The reactants may make up ≥80%, ≥90% or ≥95% and/or ≤99% or ≤98% by dry weight of the binder composition.

The binder composition applied to the non or loosely assembled matter comprises reactants which cross-link when cured to form a cured binder which holds the non or loosely assembled matter together to form the composite product. The binder composition comprises reactants that will preferably form a thermoset resin upon curing. The resin is preferably a reactant. The combination in the binder composition of the Maillard reactants with the resin (and/or resin reactants) may be used to impart improved weather resistance, water repellence and/or waterproofing properties compared with the resin (and/or resin reactants) when used alone, notably for articles comprising waterproof and/or water-resistant starch based binders.

The binder composition is preferably free of, or comprises no more than 2 wt % or no more than 5 wt % by dry weight of formaldehyde resin, notably formaldehyde resin selected from melamine formaldehyde resin, melamine urea formaldehyde resin, urea formaldehyde resin, phenol formaldehyde resin, melamine phenol formaldehyde resin, ketone formaldehyde resin and combinations thereof. The binder composition may be prepared by combining reactants comprising, consisting essentially of or consisting of the reducing sugar reactant(s) and the nitrogen-containing reactant(s) and the resin (and/or resin reactants). In the form in which it is applied to the non or loosely assembled matter the binder composition may comprise (a) the reducing sugar reactant(s) and the nitrogen-containing reactant(s) and/or (b) curable reaction product(s) of the reducing sugar reactant(s) and the nitrogen-containing reactant(s).

The binder composition may comprise a resin and/or reactants thereof where the resin is selected from latex resin, formaldehyde resin, notably formaldehyde resin selected from melamine formaldehyde resin, melamine urea formaldehyde resin, urea formaldehyde resin, phenol formaldehyde resin, melamine phenol formaldehyde resin, ketone formaldehyde resin, carboxymethyl-cellulose-based resin, starch-based resin, polyurethane resin, polyurea and polyurethane hybrid, rubber resin Bakelite, Diallyl-phthalate resin, epoxy resin, epoxy novolac resin, benzoxazine resins used alone or hybridised with epoxy and/or phenolic resins, polyimide resins, bismaleimide resins cyanate ester resins, polycyanurate resins, furan resins, silicone resins, thiolyte resins, vinyl ester resins, styrene acrylic resins, acrylic resins, vinyl acrylic resins, styrene butadiene resins, vinyl acetate homopolymer resins, ethylene vinyl acetate resins, acrylic vinylidene chloride, resins and blends and/or and combinations thereof. The binder composition may comprise a resin and/or reactants thereof selected from latex resin, carboxymethyl-cellulose-based resin, starch-based resin and combinations thereof. The binder composition may comprise at least 50 wt % or at least 60 wt %, or even at least 70 wt % by dry weight of the resin and/or reactants thereof.

The term "loosely arranged resinated matter" as used herein means that the resinated matter is assembled together with sufficient integrity for the resinated matter to be processed along a production line but without the resinated matter being permanently joined together in a way that is achieved by fully cross-linking the binder composition. Prior to curing, the binder composition preferably provides a stickiness or tackiness which holds that loosely arranged matter together.

As used herein, the term "consist or consisting essentially of" is intended to limit the scope of a statement or claim to the specified materials or steps and those that do not materially affect the basic and novel characteristic(s) of the invention.

The reducing sugar reactant(s) may comprise: a monosaccharide, a monosaccharide in its aldose or ketose form, a disaccharide, a polysaccharide, a triose, a tetrose, a pentose, xylose, a hexose, dextrose, fructose, a heptose, or mixtures thereof. The reducing sugar reactant(s) may be yielded in situ by carbohydrate reactant(s), notably carbohydrate reactant(s) having a dextrose equivalent of at least about 50, at least about 60, at least about 70, at least about 80 or at least about 90, notably carbohydrate reactant(s) selected from the group consisting of molasses, starch, starch hydrolysate, cellulose hydrolysates, and mixtures thereof. The reducing sugar reactant(s) may comprise or consist of a combination of dextrose and fructose, for example in which the combination of dextrose and fructose makes up at least 80 wt % of the reducing sugar reactant(s) and/or in which the dextrose makes up at least 40 wt % of the reducing sugar reactant(s) and/or in which the fructose makes up at least 40 wt % of the reducing sugar reactant(s); the reducing sugar reactant(s) may comprise or consist of high fructose corn syrup (HFCS). The reducing sugar reactant(s) may comprise or consist of reducing sugar reactant(s) yielded in situ by sucrose. The reducing sugar reactant(s) may comprise reducing sugar reactant(s) selected from the group consisting of xylose, arabinose dextrose, mannose, fructose and combinations thereof, for example making up at least 80 wt % of the reducing sugar reactant(s).

As used herein, the term "nitrogen-containing reactant(s)" means one or more chemical compound which contain(s) at least one nitrogen atom and which is/are capable of reacting with the reducing sugar reactant(s); preferably the nitrogen-containing reactant(s) consist of Maillard reactant(s), that is to say reactant(s) which is/are capable of reacting with the reducing sugar reactant(s) as part of a Maillard reaction.

The nitrogen-containing reactant(s) comprise, and may consist essentially of or consist of, triprimary triamine(s) having spacer groups between each of the three primary amines which consist of carbon chains. The triprimary triamine(s) may be selected from the group consisting of triaminodecanes, triaminononanes, notably 4-(aminomethyl)-1,8-octanediamine, triaminooctanes, triaminoheptanes, notably 1,4,7-triaminoheptane, triaminohexanes, notably 1,3,6-triaminohexane, triaminopentanes, and including isomers and combination thereof.

As used herein the term "triprimary triamine(s)" means organic compound having three and only three amines, each of the three amines being primary amines (—$NH_2$). One, two or each of the primary amine(s) of the triprimary triamine(s) may be present in the form of a salt, e.g as an ammonium group (—$NH_3$).

As used herein, the term "spacer group" in the terminology "the spacer group(s) separating each of the three primary amines" means a chain separating two primary amines. As used herein, the term "the spacer group(s) separating each primary amines in the molecule consists of carbon chains" means that the spacer group(s) consist only of carbon atoms bonded to hydrogen atoms or bonded to other carbon atoms. The triprimary triamine(s) having spacer groups between each of the three primary amines which consist of carbon chains thus consist of the three primary amines and carbon and hydrogen atoms. For example, when the spacer group(s) separating each primary amine in the molecule consists of carbon chains, no heteroatoms are present in the spacer groups.

The spacer group(s) may be selected from the group consisting of alkanediyls, heteroalkanediyls, alkenediyls, heteroalkenediyls, alkynediyls, heteroalkynediyls, linear alkanediyls, linear heteroalkanediyls, linear alkenediyls, linear heteroalkenediyls, linear alkynediyls, linear heteroalkynediyls, cycloalkanediyls, cycloheteroalkanediyls, cycloalkenediyls, cycloheteroalkenediyls, cycloalkynediyls and cycloheteroalkynediyls, each of which may be branched or unbranched. The spacer group(s) may be selected from the group consisting of alkanediyls, alkenediyls, alkynediyls, linear alkanediyls, linear alkenediyls, linear alkynediyls, cycloalkanediyls, cycloalkenediyls and cycloalkynediyls, each of which may be branched or unbranched. The spacer group may comprise or may be devoid of halogen atoms. The spacer groups may comprise or be devoid of aromatic groups. As used herein: the term "alkanediyl" means a saturated chain of carbon atoms ie without carbon-carbon double or triple bonds; the term "alkenediyl" means a chain of carbon atoms that comprises at least one carbon-carbon double bond; the term "alkynediyl" means a chain of carbon atoms that comprises at least one carbon-carbon triple bond; the term "cyclo" in relation to cycloalkanediyl, cycloalkenediyl and cycloalkynediyl indicates that at least a portion of the chain is cyclic and also includes polycyclic structures; and the term "linear" in relation to alkanediyls, alkenediyls and alkynediyls indicates an absence of a cyclic portion in the chain. As used herein, the term "hetero" in relation to heteroalkanediyls, heteroalkenediyls, heteroalkynediyls, linear heteroalkanediyls, linear heteroalkenediyls, linear heteroalkynediyls, cycloheteroalkanediyls, cycloheteroalkenediyls, and cycloheteroalkynediyls means that the chain comprises at least one polyvalent heteroatom. As used herein, the term heteroatom is any atom that is not carbon or hydrogen. As used herein, the term polyvalent atom means an atom that is able to be covalently bonded to at least 2 other atoms. The polyvalent heteroatom may be oxygen; it may be silicon; it may be sulfur or phosphorus. One, two or preferably each of the spacer groups may have a total number of polyvalent atoms, or a total number of carbon atoms which is ≥3, ≥4 or ≥5 and/or ≤12, ≤10 or ≤9. One, two or preferably each of the spacer groups may have a spacer length which is ≥3, ≥4 or ≥5 and/or ≤12, 510 or ≤9. As used herein, the term "spacer length" in relation to a spacer group separating two primary amines means the number of polyvalent atoms which form the shortest chain of covalently bonded atoms between the two primary amines. Each of the spacer groups between the three primary amines of the TPTA triprimary triamine(s) may: consist of an alkanediyl; and/or be linear; and/or be unbranched; and/or have a number of carbon atoms which is ≥3 or ≥4 and/or ≤9 or ≤8; and or have a spacer length which is ≥3 or ≥4 and/or ≤9 or ≤8. The total number of the polyvalent atoms of the TPTA triprimary triamine(s) may be ≥9, ≥11 or ≥12 and/or ≤23, ≤21, ≤19 or ≤17.

The nitrogen-containing reactant(s) may comprise reactant(s) selected from the group consisting of: inorganic amines, organic amines, organic amines comprising at least one primary amine, salts of an organic amine comprising at least one primary amine, polyamines, polyprimary polyamines and combinations thereof, any of which may be substituted or unsubstituted. The nitrogen-containing reactant(s) may comprise $NH_3$, $NH_3$ may be used as such (e.g. in form of an aqueous solution), or as an inorganic or organic ammonium salt, for example ammonium sulfate ($AmSO_4$), ammonium phosphate, e.g. diammonium phosphate or ammonium citrate, e.g. triammonium citrate, or as a source of $NH_3$, e.g. urea. As used herein, the term "polyamine" means any organic compound having two or more amine groups and the term "polyprimary polyamine" means an organic compound having two or more primary amines ($-NH_2$). As used herein the term "substituted" means the replacement of one or more hydrogen atoms with other functional groups. Such other functional groups may include hydroxyl, halo, thiol, alkyl, haloalkyl, heteroalkyl, aryl, arylalkyl, arylheteroalkyl, nitro, sulfonic acids and derivatives thereof, carboxylic acids and derivatives thereof.

The polyprimary polyamine may be a diamine, triamine, tetramine, or pentamine. As used herein the term "diamine" means organic compound having two (and only two) amines, "triamine" means organic compound having three (and only three) amines, "tetramine" means organic compound having four (and only four) amines and "pentamine" means organic compound having five (and only five) amines. For example, the polyprimary amine may be: a triamine selected from diethylenetriamine (which is a diprimary triamine, i.e. diethylenetriamine has three amines, two of them being primary amines) or bis(hexamethylene)triamine; a tetramine, notably triethylenetetramine; or a pentamine, notably tetraethylenepentamine. The polyprimary polyamine may comprise or consiste essentially of diprimary diamine, notably 1,6-diaminohexane (hexamethylenediamine, HMDA) or 1,5-diamino-2-methylpentane (2-methyl-pentamethylenediamine). The nitrogen-containing reactant(s) may comprise or consist essentially of TPTA triprimary triamine(s).

The binder composition may comprise, consist essentially of or consist of a binder composition obtained or obtainable by combining reactants wherein:
the reducing sugar reactant(s) make up:
  ≥10%, ≥15%, ≥20% by dry weight of the reactant(s), and/or
  ≤50%, ≤45%, ≤40%, ≤35% by dry weight of the reactant(s), and/or
the nitrogen-containing reactant(s) make up:
  ≥2%, ≥3%, ≥4%, ≥5% by dry weight of the reactant(s), and/or
  ≤15%, ≤14%, ≤12%, ≤10% by dry weight of the reactant(s), and
the resin and/or reactant(s) thereof make up:
  ≥50%, ≥60%, ≥65%, ≥70%, ≥75%, ≥80%, ≥85%, ≥90%; by dry weight of the reactant(s);
and/or
  ≤99%, ≤98% or ≤95%, ≤90% by dry weight of the reactant(s).
A diprimary diamine and/or TPTA triprimary triamine(s) may make up:
  ≥2%, ≥3%, ≥4%, ≥5%, and/or
  ≤15%, ≤14%, ≤12%, ≤10%
by dry weight of the reactants of the binder composition.
A diprimary diamine and/or TPTA triprimary triamine(s) may make up:
  ≥5%, ≥10%, ≥15%, ≥20%, ≥30%, ≥40%, ≥50%, ≥60%, ≥65%; and/or
  ≤95%, ≤90%, ≤85%, ≤80%, ≤70%, ≤60%, ≤50%, ≤45%, ≤30%
by dry weight of the nitrogen-containing reactants.
The TPTA triprimary triamine(s) may make up: ≥90% and ≤99%; or ≥80% and ≤90%; or ≥60% and ≤80%; by dry weight of the nitrogen-containing reactants; Particularly in the aforementioned cases, the remaining nitrogen-containing reactants may comprise amines and/or nitriles.

The ratio of carbonyl groups in the reducing sugar reactant(s) to reactive amino groups in the nitrogen-containing reactant(s) may be in the range of 5:1 to 1:2. For example, the ratio of carbonyl groups to reactive amino groups may be in the range of 5:1 to 1:1.8, 5:1 to 1:1.5, 5:1 to 1:1.2, 5:1 to 1:1, 5:1 to 1:0.8 and 5:1 to 1:0.5. Further examples include ratios such as 4:1 to 1:2, 3.5:1 to 1:2, 3:1 to 1:2, 2.5:1 to 1:2, 2:1 to 1:2 and 1.5:1 to 1:2. As used herein, the term "reactive amino group" means any amino group in the nitrogen-containing reactant(s) which is capable of reacting with the reducing sugar reactant(s). Specifically, examples of such reactive amino groups comprise primary and secondary amine(s).

The nitrogen-containing reactant(s) and the reducing sugar reactant(s) are preferably Maillard reactants. The nitrogen-containing reactant(s) and the reducing sugar reactant(s) (or their reaction product(s)) preferably react to form Maillard reaction products, notably melanoidins when cured. The cured binder composition may comprise melanoidin-containing and/or nitrogenous-containing polymer(s). The cured binder composition is preferably a thermoset binder and is preferably substantially water insoluble.

The binder composition and/or the cured binder may comprise ester and/or polyester compounds.

All the reducing sugar reactant(s) and all the nitrogen-containing reactant(s) of the binder composition may be combined in a single preparation step, for example by dissolving the reducing sugar reactant(s) in water and then adding the nitrogen-containing reactant(s). The term "single preparation step" is used herein to differentiate from a "multiple preparation step" preparation in which a first portion of reactants are combined and stored and/or allowed to react for a pre-determined time before addition of further reactants.

Alternatively, the reducing sugar reactant(s) and the nitrogen containing reactant(s) of the binder composition may be combined by:
  combining reducing sugar reactant(s), notably all of the reducing sugar reactant(s), with a first portion of the nitrogen-containing reactant(s) to provide an intermediate mixture of reducing sugar reactant(s) and nitrogen containing reactant(s),
  storing the intermediate mixture of reducing sugar reactant(s) and nitrogen containing reactant(s); and
  combining the intermediate mixture of reducing sugar reactant(s) and nitrogen containing reactant(s) with a second portion of the nitrogen-containing reactant(s) to provide the mixture of all reducing sugar reactant(s) and all nitrogen containing reactant(s).

The intermediate mixture of reducing sugar reactant(s) and nitrogen containing reactant(s) may comprise, consist essentially of or consist of reaction products of the reducing sugar reactant(s), with a first portion of the nitrogen-containing reactant(s). The reactants may be heated to provide the intermediate mixture of reducing sugar reactant(s) and nitrogen containing reactant(s); the intermediate mixture of reducing sugar reactant(s) and nitrogen containing reactant(s) may be subsequently cooled.

The first and second portions of nitrogen-containing reactant(s) may be the same nitrogen-containing reactant(s) or, alternatively they may be different nitrogen-containing reactant(s). Only one of the first and second portion of nitrogen-containing reactant(s), or alternatively each of the first and second portion of nitrogen-containing reactant(s), may comprise, consist essentially of or consist of a diprimary diamine and/or TPTA triprimary triamine(s).

As used herein "storing the intermediate mixture of reducing sugar reactant(s) and nitrogen containing reactant(s)" means that the intermediate mixture of reducing sugar reactant(s) and nitrogen containing reactant(s) is stored or shipped for a prolonged time, notably without crystallization of the reducing sugar reactant(s) or gelling which would render the binder composition unusable. The intermediate mixture of reducing sugar reactant(s) and nitrogen containing reactant(s) may be stored for a period of at least 30 min, at least 1 h, at least 4 h, at least 12 h, at least 24 h, at least 96 h, at least 1 week, at least 2 weeks, or at least 4 weeks.

Preparation of the binder composition may comprise:
  a) combining in a single preparation step: the reducing sugar reactant(s); the nitrogen containing reactant(s) and; a resin and/or reactants thereof;
  b) combining a resin and/or reactants thereof with an intermediate mixture of reducing sugar reactant(s) and nitrogen containing reactant(s); or
  c) combining a resin and/or reactants thereof with a mixture comprising the totality of the reducing sugar reactant(s) and nitrogen containing reactant(s).

The binder composition may comprise one or more additive, for example one or more additives selected from waxes, dyes dedusting oil, release agents, formaldehyde scavengers (for example urea, tannins, quebracho extract, ammonium phosphate, bisulfite), water repellent agent, silanes, silicones, lignins, lignosulphonates and non-carbohydrate polyhydroxy component selected from glycerol, polyethylene glycol, polypropylene glycol, trimethylolpropane, pentaerythritol, polyvinyl alcohol, partially hydrolyzed polyvinyl acetate, fully hydrolyzed polyvinyl acetate, or mixtures thereof. Such additives are generally not reactants of the binder composition, that is to say they so do not cross-link with the reducing sugar and/or the nitrogen containing reactant(s) (or reaction products thereof) as part of the curing of the binder composition.

The binder composition may be applied to the non or loosely assembled matter in the form of a liquid, notably in the form of an aqueous composition, for example comprising an aqueous solution or dispersion, notably in which the dry weight of the aqueous binder composition makes up: ≥5 wt %, ≥10 wt %, ≥15 wt %, ≥20 wt % or ≥25 wt % and/or ≤95 wt %, ≤90 wt %, ≤85 wt % or ≤80 wt % of the total weight of the aqueous binder composition. Alternatively, the binder composition may be applied to the non or loosely assembled matter in the form of a solid, for example as a powder or as particles. The binder composition may be applied by being sprayed. The binder composition may be applied to the non or loosely assembled matter by passing the non or loosely assembled matter through a spray of the binder composition or by spraying the binder composition over the non or loosely assembled matter. The binder composition may be applied by being spread, for example as a continuous layer or as a discontinuous layer, for example as lines of binder. Other application techniques include roll application, dip coating and dry mixing.

The present disclosure further provides for curable, formaldehyde free binder compositions that impart commercially beneficial properties to finished articles such as corrugated boards, wood and composite boards, and insulation articles. In certain embodiments, these properties include but are not limited to weather resistance, water repellence and waterproofing. In additional embodiments, articles and commercial products comprising the binder compositions disclosed herein are advantageously recyclable and/or repulpable.

Without being bound by theory, it has been found that when introducing a compound capable of forming a carbamate compound, e.g. by bubbling carbon dioxide through a solution comprising a) the reducing sugar reactant(s) and nitrogen-containing reactant(s) and/or b) curable reaction product(s) of reducing sugar reactant(s) and nitrogen-containing reactant(s), the presence of one or more carbamate compounds is capable of delaying or preventing further reaction of the nitrogen-containing reactant(s) and/or curable reaction product(s) of reducing sugar reactant(s) and nitrogen-containing reactant(s) with other components of the binder composition, wherein "further reaction" includes deleterious polymerization and/or cross-linking of the solution components, and further prevents or reduces undesirable viscosity increases of the binder composition during storage and/or shipping under both ideal and non-optimal shipping and/or storage conditions. Subsequent heating, notably during curing of the binder composition, may be used to separate oxygen based components such as carbon dioxide from the binder composition and thus allow the reactants previously stabilized for storage to participate in curing of the binder composition.

Carbon dioxide ($CO_2$) may be injected into the binder composition at a concentration capable of reacting approximately stoichiometrically with the nitrogen containing reactant(s), notably following reaction between the reducing sugar reactant(s) and nitrogen-containing reactant(s) to form curable reaction product(s) of the reducing sugar reactant(s) and nitrogen-containing reactant(s). Carbon dioxide ($CO_2$) may be injected to produce a concentration of about 0.5-5% by weight with respect to the binder composition, notably about 1-2% by weight. The carbon dioxide ($CO_2$) may be introduced to the binder composition using a stainless steel needle; a nano-, micro- or mini-bubbler system; or any bubbler/aerator capable of introducing CO2 into the binder composition.

The binder composition is preferably water soluble; it may have a water-solubility at ambient conditions (e.g. at approximately 20° C. and 1 atm) of 100 g/l or more, 150 g/l or more, 200 g/l or more, 250 g/l or more, 300 g/l or more, 400 g/l or more, 500 g/l or more, and 600 g/l or more.

Preferably the viscosity of the binder composition in solution resists increases by more than 1000 cP when left to stand at ambient temperatures, i.e. at temperatures of about 20-25° C., for a time period of 12, 24, 48, 72 or 96 hours. In further embodiments, the viscosity of the aqueous solution advantageously does not increase by more than 10 000 cP over a time period of 7, 10, 12, 14, 21, 28, 30, 60 or 90 days. According to further embodiments, the amount by which the viscosity of a 70 wt. % aqueous solution of the disclosed composition increases within the first 12 hours when left to stand at 20° C. does not exceed 500, 400, 300, 250, 200, 150, 100, 50, 10 and 5 centiPoise (cP) or less. Preferably, a 70 wt. % aqueous solution of the binder composition does not increase in viscosity by more than 1000 cP within the first 48 hours after its preparation, and notably does not increase by more than 2000 cP within two weeks after its preparation. Excessive viscosity increases for an aqueous solution of the binder composition may result in "gelling," which may render the binder composition unusable.

In some preferred embodiments, the binder composition allows for one or more reactions of the reducing sugar reactant(s) and nitrogen-containing reactant(s) and/or curable reaction product(s) of reducing sugar reactant(s) and nitrogen-containing reactant(s) of the binder composition following the evolution, removal and/or degassing of carbon dioxide. Accordingly, such reactions allow for further reactions with one or more crosslinkers for producing a polymeric binder. For example, this polymeric binder may contain high molecular weight polymers, e.g. melanoidins, as essentially water insoluble Maillard reaction products. For example, the binder composition may be prepared by mixing a reducing sugar reactant with a nitrogen containing reactant which consists of or comprises hexamethylenediamine (HMDA) and/or 4-(aminomethyl)-1,8-octanediamine (AMOD) and adding $CO_2$. Subsequently, further nitrogen containing reactant, for example further hexamethylenediamine and/or 4-(aminomethyl)-1,8-octanediamine (AMOD), may be added to the binder composition to achieve the high grade of polymerization required in the respective polymerized application.

Preparation of the binder composition may comprise: i) providing the reducing sugar reactant(s); (ii) providing the nitrogen containing reactant(s); (iii) providing carbon dioxide; (iv) mixing in a solvent the reducing sugar reactant(s) and the nitrogen containing reactant(s); (v) cooling, notably at room temperature; and (vi) bubbling carbon dioxide into the mixture obtained in step (iv).

The carbon dioxide may be introduced via direct injection, e.g. through bubbling, into the mixture, notably at a rate of about 0.5 to 50 wt. % based on the total weight of the binder composition, or at a rate of about 1 to about 45 wt. %, about 1 to about 40 wt. %, about 1 to about 35 wt. %, about 1 to about 30 wt. %, about 1 to about 25 wt. %, about 1 to about 20 wt. %, about 1 to about 15 wt. %, about 1 to about 10 wt. %, and about 1 to about 5 wt. %. In alternative embodiments, carbonic acid or "soda water" may be utilized as a source of carbon dioxide to provide all or part of the carbon dioxide for the disclosed binder composition. A preformed carbamate compound produced via reaction with the at least one nitrogen containing reactant(s) may be used.

Figure 2:
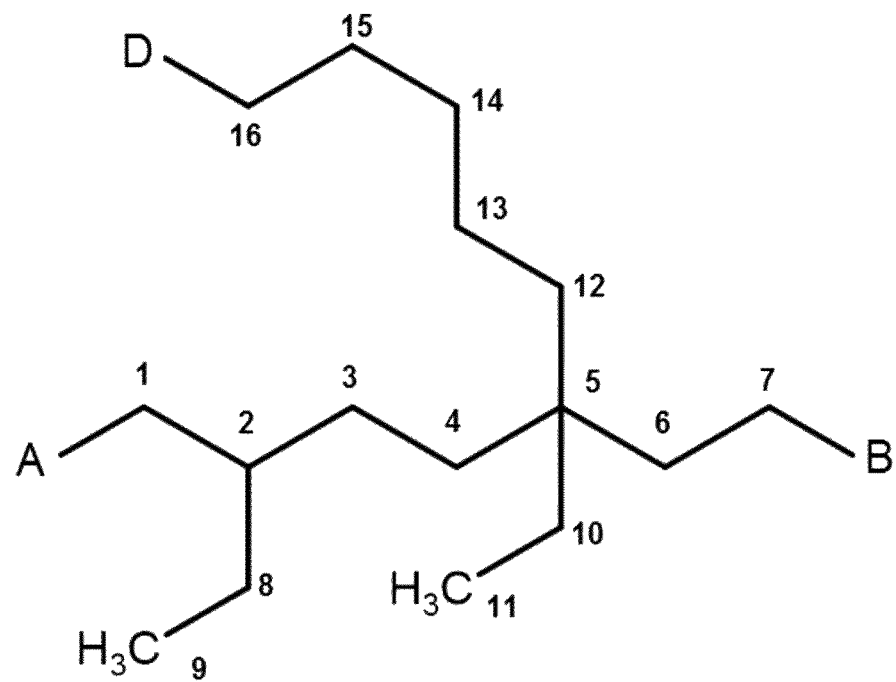
FIG. 2 shows an example of TPTA triprimary triamine ("AMOD")
Figures 3, 4:
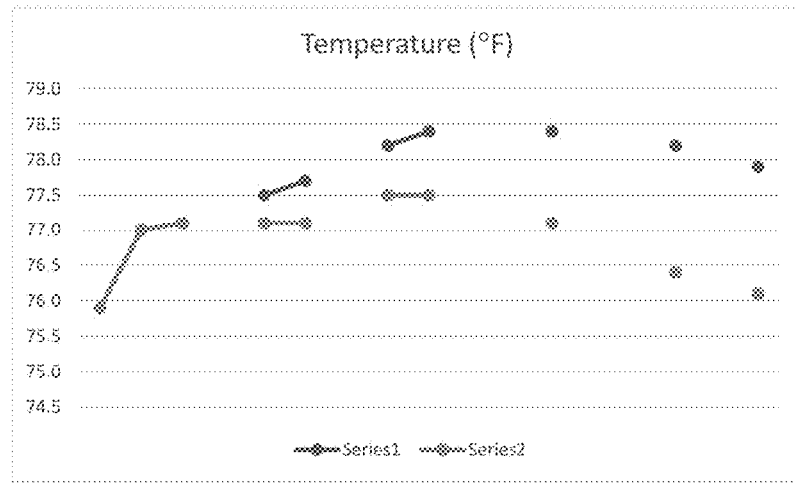
FIG. 3 shows results of a thermal stability study for binder compositions.
FIG. 4 shows results of a temporal viscosity study.

The invention will now be described by way of example only with reference to the accompanying drawing of which:

FIG. 1 shows 4-(aminomethyl)-1,8-octanediamine;

FIG. 2 shows an example of TPTA triprimary triamine ("AMOD");

FIG. 3 shows results of a thermal stability study for binder compositions; and

FIG. 4 shows results of a temporal viscosity study.

FIG. 2 illustrates a TPTA triprimary triamine having three primary amines A, B, D with spacer groups which consist of carbon chains between each of its three primary amines. Each carbon atom is numbered to facilitate the explanation below.

The spacer group between primary amines A and B:
has a spacer length of 7, i.e. carbon atoms 1, 2, 3, 4, 5, 6, 7 which together form the shortest chain of covalently bonded polyvalent atoms between primary amines A and B (the carbon atoms of the two branched chains 8, 9 and 10, 11 do not form part of the spacer length;
has 11 polyvalent atoms, ie carbon atoms 1, 2, 3, 4, 5, 6, 7, 8, 9, 10 and 11 (the carbon atoms 12, 13, 14, 15, 16 do not form part of the spacer group between A and B as they form a chain which connects the third primary amine D to the molecule).

The spacer group between primary amines A and D:
has a spacer length of 10, i.e. carbon atoms 1, 2, 3, 4, 5, 12, 13, 14, 15, 16;
has 14 polyvalent atoms, i.e. carbon atoms 1, 2, 3, 4, 5, 8, 9, 10, 11, 12, 13, 14, 15, 16.

The spacer group between primary amines B and D:
has a spacer length of 8, i.e. carbon atoms 7, 6, 5, 12, 13, 14, 15, 16;
has 10 polyvalent atoms, ie carbon atoms 7, 6, 5, 12, 13, 14, 15, 16, 10, 11 (the chain of carbon atoms 4, 3, 2, 1, 8, 9 does not form part of the spacer group between B and D as this form a chain which connects the other primary amine A to the molecule.

The total number of polyvalent atoms in the molecule is 19, i.e. carbon atoms 1 to 16 and the 3 nitrogen atoms of the 3 primary amines A, B and D.

Example 1: Binder Composition Stability Testing

An aqueous binder composition ("H3823"—a 38 wt. % binder solids solution obtained by combining, by dry weight, 23 wt. % hexamethylenediamine (HMDA) as the nitrogen containing reactant and HFCS (high fructose corn syrup) as the reducing sugar reactant) was produced and observed to have an initial viscosity of about 15 centiPoise (cP). The initial sample was then divided into two (2) H3823 aliquots, which are exemplified as "Unshaken" (Series 2) and "Shaken" (Series 1) in FIG. 3. Both samples were subjected to approximately ambient temperature and pressure conditions, i.e. a temperature of about 68-70° F. and a pressure of approximately 1 atmosphere (atm). The first sample ("Shaken") was sealed in a first storage vessel and unshaken, during which the temperature of the composition increased by about 7° F. (to a temperature of about 77° F.) over room temperature and remained at this elevated temperature for about five (5) days (about 120 hours). Following a period of about seven (7) days (about 168 hours), the first sample cooled to about 3° F. above room temperature.

The second sample ("Shaken") was shaken three times a day, at a frequency of one shake approximately every 2-3 hours, on weekdays (Monday-Friday, unshaken on Saturday-Sunday). The temperature of the "Shaken" sample was observed to increase by about 10° F. over room temperature (to a temperature of about 80° F.) and remained at the elevated temperature for about seven (7) days (about 168 hours) and was observed to cool down to room temperature (about 70° F.) at a significantly slower rate. However, both the "Unshaken" and "Shaken" were found to comprise very similar viscosity values (about 18.5 cP) following the seven (7) day trial period. Additionally, both samples ("Shaken" and "Unshaken") were observed to resist thermal damage when maintained at solution temperatures at or below 80° F.

Example 2. Additional Thermal Stability Measurements for Binder Compositions

In a trial separate from that described for the H3823 composition in Example 1, it was observed that a quart of the unmodified tanker batch gelled following overnight storage (a time period of about 10-12 hours) at a temperature of about 102° F. In an effort to extend usability and shelf life for the claimed composition, a separate sample was taken and time-dependent viscosity values were measured at ambient temperature and pressure conditions (about 20-25° F. and about 1 atm) over about 25 days (about 600 hours):

TABLE 1

| Age of Sample (Days) | Viscosity (cP) |
| --- | --- |
| 1 | 13 |
| 3 | 14 |
| 7 | 17 |
| 13 | 18.5 |
| 18 | 24 |
| 21 | 34 |
| 22 | 55 |
| 23 | 120 |
| 25 | Gel |

Under ambient conditions, the sample exhibited a commercially viable product shelf life of greater than 3 weeks, with disadvantageous product gelling occurring around 3.5-4 weeks (about 600 to about 684 hours). In a follow-up trial, an additional time dependent assay was performed on an H3823 sample initially maintained under ambient conditions. As shown in Table 2, separate aliquots of the sample were then exposed to 1) a temperature of 98° F. after two days (about 48 hours) for a time period of about 48 hours; and 2) a temperature of 87° F. after four days (about 96 hours) for a time period of about 24 hours:

TABLE 2

| Sample History | Exposure Time | Viscosity (cP) |
| --- | --- | --- |
| Maintained at room temperature for five days (~120 hours) | 24 hours | 17 cP |
| Exposed to 98° F. after two days (~48 hours) | 48 hours | Gel |
| Exposed to 87° F. after four days (~96 hours) | 24 hours | 16 cP |

In an effort to achieve enhanced thermal/temporal stability, a 50 wt. % binder solids binder composition was prepared by mixing, by dry weight, 23 wt. % hexamethylenediamine (HMDA) and 77 wt. % high fructose corn syrup (described herein as "H5023") and evaluated for shelf life stability as a function of compositional pH. A single aliquot, comprising a pH of about 11.3, was not treated with carbon dioxide ($CO_2$), while five aliquots were subjected to bubbling with sufficient volumes of $CO_2$ to achieve the pH levels disclosed in Table 3 below:

TABLE 3

| Sample pH | Observed Physical States/Measured Viscosity |
| --- | --- |
| 11.3 (no $CO_2$ treatment) | Liquid (Day 18); Gel (Day 19) |
| 9.4 ($CO_2$ treatment) | Liquid (Day 19); 190 cP (Day 110) |
| 8.6 ($CO_2$ treatment) | Liquid (Day 19); 60 cP (Day 110) |
| 8.3 ($CO_2$ treatment) | Liquid (Day 19); 52 cP (Day 110) |
| 8.1 ($CO_2$ treatment) | Liquid (Day 19); 50 cP (Day 110) |
| 8.0 ($CO_2$ treatment) | 31 cP (19 Days); 50 cP (Day 110) |

As shown in Table 3, the H5023 sample (comprising 50% binder solids) exhibited a shelf life stability of at least about 110 days, after which no further measurements were recorded. It was observed that the $CO_2$ treated samples (pH of 9.4, 8.6, 8.3, 8.1, and 8.0) exhibited sufficient thermal stability and characteristics associated with sufficient storage/shelf life stability, as well as stability during the transportation and/or processing of the material. For instance, the pH 8.0, CO2 treated aliquot had an initial viscosity of about 25 cP, a viscosity of about 31 cP after 19 days, and a viscosity of about 50 cP after 110 days.

A duplicate H5023 sample was then created and divided into three (3) separate aliquots for determining compositional viscosity following (1) no treatment with $CO_2$; (2) $CO_2$ treatment to produce a compositional pH of 9.33; and (3) $CO_2$ treatment to produce a compositional pH of 8.22. The resulting viscosity values as a function of time and pH are provided in Table 4:

TABLE 4

| Time Elapsed (hours) | No $CO_2$ Treatment | $CO_2$ Treatment pH = 9.33 | $CO_2$ Treatment pH = 8.22 |
| --- | --- | --- | --- |
| 24 | 22 | 23 | 25 |
| 120 | 42 | 28 | 30 |

Additional H5023 samples were treated with $CO_2$ to produce the compositional pH values described in Table 5 (below), where commercial viability/stability was observed to be at or greater than about 90 days at pH values of 8.6 and 8.2:

TABLE 5

| pH | Days | Viscosity (cP) | Estimated Usability of Material (days) |
|---|---|---|---|
| 11.2 | 19 | Gel | 15 |
| 9.3 | 64 | 138 | 60+ |
| 8.6 | 80 | 50 | 90+ |
| 8.2 | 64 | 36 | 90+ |

Example 3

Binder Compositions Comprising Increased Solids/Nitrogen-containing reactant concentrations. In further efforts to enhance commercial properties two (2) quarts of a 70 wt. % binder solids binder composition were prepared by combining, by dry weight, 30 wt. % hexamethylenediamine (HMDA) and 70 wt. % high fructose corn syrup (described herein as "H7030"). The results for various ($CO_2$ treated and untreated) binder samples as a function of pH and time are shown in FIG. 2.

An additional sample comprising 70 wt. % binder solids prepared by combing, by dry weight, 23 wt. % hexamethylenediamine (HMDA) and 70 wt. % high fructose corn syrup (described herein as "H7023") was produced and evaluated. This sample (comprising a decreased concentration of polyamine) was disadvantageously observed to gel to an increased degree and/or at an enhanced rate versus the H7030 composition, which suggests that the additional polyamine concentration comprising the H7030 sample may provide thermal and/or temporal stability under certain processing, transporting and/or storage conditions versus a sample with a decreased polyamine concentration, e.g. H7023.

Example 4. User of Binder Composition for Enhancing Corrugated Board/Cardboard Performance In an effort to improve the performance of starch comprising, corrugated cardboard articles and manufacturing processes for producing these articles, a 50 wt. % solids composition was prepared by combining, by dry weight, and 19 wt. % 4-(aminomethyl)-1,8-octanediamine (AMOD)— commercially available as Hexatran™ from Ascend Performance Materials and 81 wt. % high fructose corn syrup, hereinafter referred to as "T5019," was prepared. It was observed that this composition was stable under ambient temperature/pressure conditions on a benchtop for at least about four (4) months. A batch of T5019 was then treated with a sufficient concentration of $CO_2$ to produce a compositional pH of about 8.8. The resulting composition is hereinafter described as "MaxxLink® Gold".

The MaxxLink® Gold composition was incorporated in a corrugated produce cardboard box at a concentration of 2.0% (weight/weight) as a waterproofing agent for starch based compositions and compared to a corrugated produce cardboard box comprising MaxxLink® XL-5000, a general purpose, ketone formaldehyde based resin used as a waterproofing agent for starch based compositions (commercially available from MCTRON™ Technologies, Greenville, SC, USA). The performance of the corrugated produce cardboard box was measured via a pin adhesion, alternatively referred to as a "wet pin adhesion" or simply "wet pins" test (see, for example, 1) https://imisrise.tappi.org/TAPPI/Products/01/T/0104T845.aspx; and 2) https://www.westpak.com/page/material-analysis/material-analysis-pin-adhesion). In certain embodiments, an ideal "wet pins" quantitative performance value for the disclosed trial is in the range of about 2 to about 6, including about 4 to about 5. The results are shown in Table 6 below:

TABLE 6

| | MaxxLink XL-5000 | MaxxLink Gold |
|---|---|---|
| Board Caliper | 0.27 | 0.27 |
| Edge Crush | 71.4 | 72.4 |
| DB Dry Pins | 54.9 | 55.8 |
| SF Dry Pins | 61.8 | 66.6 |
| DB Wet Pins | 3.08 | 3.33 |
| SF Wet Pins | 4.29 | 2.15 |

Example 5. Alternative Binder

In additional trials, the performance of the disclosed binder was evaluated in comparison with N-methylolacrylamide (N-MA; molecular formula: $C_4H_7NO_2$) and formaldehyde containing formulations. N-MA is used commercially in adhesives, binders, coatings and resins, including its use in latex based compositions. Commercial articles comprising N-MA may comprise significant concentrations, e.g. 200 ppm and greater, of formaldehyde, while generating and emitting significant levels of formaldehyde during manufacturing processes associated with N-MA.

As a potential substitute for a binder composition comprising N-MA and a PVAc resin, a binder comprising Maillard reactants ("H5023" as described herein) and polyvinyl acetate (PVAc) was prepared and compared to 1) an N-MA/PVAc binder; and 2) unmodified PVAc. Physicochemical performance was evaluated, specifically heat (via a "hot stiffness" test, a subjective measure of fabric cutting ease) and solvent resistance, wherein the weight fraction of the composition that dissolves in acetone after an hour is measured (wherein increased percentages of insoluble correlate to increased solvent resistance). As shown in Table 7 below, the Maillard reactants modified PVAc binder demonstrated comparable performance to the N-MA/PVAc binder, as well as improved solvent resistance versus the PVAc control. In addition, the Maillard reactants modified PVAc binder beneficially demonstrates a significant reduction in formaldehyde production as measured by the American Association of Textile Colorants and Chemists (AATCC) Test Method TM112 (https://www.aatcc.org/test/methods/).

TABLE 7

| | N-MA Modified PVAc | Unmodified PVAc | Maillard reactants Modified PVAc |
|---|---|---|---|
| Percentage of Insolubles in Acetone | 91.3 | 68.4 | 93.8 |
| Hot Stiffness | Very Good | Poor | Very Good |
| Free Formaldehyde, wet | 513 ppm | <20 ppm | <20 ppm |

Example 6. Use of Carbonic Acid/$CO_2$ for Improving Binder Performance

In additional experiments, a 54% (final) solids binder was prepared using a pre-mix of water and a H5223 binder solution (52% (initial) binder solids and 25% hexamethylenediamine (HMDA)). A sufficient volume of carbon dioxide ($CO_2$) was then bubbled through the solution to a produce a final $CO_2$ concentration of 2%, which facilitates the partial neutralize of the final solution. This pre-mix was removed from the reactor, mixed with a 70% (volume/volume) aqueous solution of high fructose corn syrup (HFCS), and re-introduced to the reactor, which was maintained at a temperature below 30° C. The resulting binder demonstrated a shelf-life under ambient temperature and pressure conditions of about 90 days, and is highly reactive as a thermosettable binder when cured on a production line at temperatures above 150° C.

TABLE 8

| Component | Wet Weight Percentage | Dry Weight Percentage |
|---|---|---|
| Water | 25.2% | 0.0% |
| HMDA (70%) | 16.0% | 11.2% |
| $CO_2$ | 4.6% | 4.6% |
| HFCS (71%) | 54.2% | 38.4% |
| Total | 100.0% | 54.2% |

In alternative embodiments, latex may further be utilized to enhance the performance of articles such as corrugated cardboard, for applications where performance issues including but not limited to binder failure and low temperature pins are observed.

The invention claimed is:

1. A method of manufacturing a composite product comprising:
   preparing a binder composition in the form of an aqueous solution, which comprises combining: i) Maillard reactants; ii) a composition selected from a resin, reactants of the resin, and combinations thereof; and water; wherein the i) Maillard reactants are selected from: one or more reducing sugar reactants and one or more nitrogen-containing reactants; one or more curable reaction products of the one or more reducing sugar reactants and the one or more nitrogen-containing reactants; and combinations thereof; wherein the one or more nitrogen-containing reactants are polyprimary polyamines which are organic compounds having two or more primary amines;
   wherein the binder composition comprises at least 50 wt % by dry weight of ii) the composition selected from a resin, reactants of a resin, and combinations thereof;
   applying the binder composition to non-assembled or loosely assembled matter to provide resinated matter;
   arranging the resinated matter to provide loosely arranged resinated matter; and
   subjecting the loosely arranged resinated matter to heat and/or pressure to cure the binder composition and to form the composite product.

2. The method in accordance with claim 1, wherein the resin is selected from latex resin, formaldehyde resin, melamine formaldehyde resin, melamine urea formaldehyde resin, urea formaldehyde resin, phenol formaldehyde resin, melamine phenol formaldehyde resin, ketone formaldehyde resin, carboxymethyl-cellulose-based resin, starch-based resin, polyurethane resin, polyurea and polyurethane hybrid resin, rubber resin, diallyl-phthalate resin, epoxy resin, epoxy novolac resin, benzoxazine resin, benzoxazine resin hybridised with epoxy and/or phenolic resin, polyimide resin, bismaleimide resin, cyanate ester resin, polycyanurate resin, furan resin, silicone resin, thiolyte resin, vinyl ester resin, and combinations thereof.

3. The method in accordance with claim 1, wherein the resin is selected from latex resin and starch-based resin.

4. The method in accordance with claim 1, wherein the binder composition comprises at least 70 wt % by dry weight of ii) the composition selected from a resin, reactants of the resin, and a combination thereof.

5. The method in accordance with claim 1, wherein the one or more reducing sugar reactants accounts for at least 15 wt % by dry weight of the reactants of the binder composition, and the one or more nitrogen-containing reactants accounts for at least 2 wt % by dry weight of the reactants of the binder composition.

6. The method in accordance with claim 1, wherein the one or more nitrogen-containing reactants is selected from di-primary diamines, HMDA, di-primary triamines, triprimary triamines, TPTA triprimary triamine(s), 4-(aminomethyl)-1,8-octanediamine, and combinations thereof.

7. The method in accordance with claim 1, wherein the composite product is a corrugated cardboard article comprising fluted corrugated sheets and a planar linerboard; wherein the binder composition bonds corrugations of the fluted corrugated sheets to the planar linerboard.

8. The method in accordance with claim 1, wherein the preparation of the binder composition prior to the application of the binder composition further comprises reacting the one or more reducing sugar reactants and the one or more nitrogen-containing reactants to provide the one or more curable reaction products of the one or more reducing sugar reactants and the one or more nitrogen-containing reactants.

9. The method in accordance with claim 1, wherein the preparation of the binder composition prior to the application of the binder composition further comprises stabilising the Maillard reactants.

10. The method in accordance with claim 9, wherein stabilising the Maillard reactants comprises reacting the Maillard reactant(s) with carbon dioxide ($CO_2$).

11. The method in accordance with claim 10, wherein stabilising the Maillard reactants comprises treating the one or more curable reaction products of the one or more reducing sugar reactants and the one or more nitrogen-containing reactants with carbon dioxide ($CO_2$).

12. The method in accordance with claim 1 in which the binder composition is prepared by:
   a) reacting the one or more reducing sugar reactants and the one or more nitrogen-containing reactants to provide the one or more curable reaction products of the one or more reducing sugar reactants and the one or more nitrogen-containing reactants;
   b) subsequently passing carbon dioxide through a solution comprising water and the one or more curable reaction products of the one or more reducing sugar reactants and the one or more nitrogen-containing reactants; and
   c) subsequently combining the solution with ii) the composition selected from a resin; reactants of a resin; and combinations thereof.

* * * * *